US009485044B2

(12) United States Patent
Luoma et al.

(10) Patent No.: US 9,485,044 B2
(45) Date of Patent: Nov. 1, 2016

(54) METHOD AND APPARATUS OF ANNOUNCING SESSIONS TRANSMITTED THROUGH A NETWORK

(75) Inventors: Juha-Pekka Luoma, Tampere (FI); Dominique Muller, Dachsen (CH); Toni Paila, Degerby (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 743 days.

(21) Appl. No.: 10/539,852

(22) PCT Filed: Nov. 27, 2003

(86) PCT No.: PCT/IB03/05468
§ 371 (c)(1),
(2), (4) Date: Jun. 22, 2006

(87) PCT Pub. No.: WO2004/056096
PCT Pub. Date: Jul. 1, 2004

(65) Prior Publication Data

US 2006/0253544 A1 Nov. 9, 2006

(30) Foreign Application Priority Data

Dec. 18, 2002 (GB) .................................. 0229477.5
Jun. 30, 2003 (GB) .................................. 0315285.7

(51) Int. Cl.
*G06F 17/30* (2006.01)
*H04H 60/25* (2008.01)
(Continued)

(52) U.S. Cl.
CPC ............. *H04H 60/25* (2013.01); *H04H 60/72* (2013.01); *H04H 60/73* (2013.01); *H04H 60/82* (2013.01)

(58) Field of Classification Search
CPC ...... H04H 60/25; H04H 60/72; H04H 60/73; H04H 60/82
USPC ........................................... 707/802; 709/217
See application file for complete search history.

(56) References Cited

U.S. PATENT DOCUMENTS 5,473,642 A * 12/1995 Osawa et al. ................. 375/377
5,559,548 A * 9/1996 Davis ..................... H04N 5/445
348/E5.099
(Continued)

FOREIGN PATENT DOCUMENTS

CN 1379335 A 11/2002
CN 1379335 A 11/2002
(Continued)

OTHER PUBLICATIONS

Cotter, Paul, et al., "PTV: Intelligent Personalised TV Guides", IAAI-00 Proceedings, AAAI (www.aaia.org), © 2000, pp. 1-8.*
(Continued)

*Primary Examiner* — Robert Stevens
(74) *Attorney, Agent, or Firm* — Ditthavong & Steiner, P.C.

(57) ABSTRACT

An electronic service guide (ESG) is provided by transmitting announcements describing multimedia sessions, such as video streams. Sessions are organized into a session directory (28) which is split into two parts: a full session directory (291) and an updated session directory (292). A first kind of announcement describes all sessions in the full session directory. A second kind of announcement describes sessions in the updated session directory. Once a client has received a description of the full session directory, it need only listen to announcements of the second type so as to learn of any updates to sessions.

31 Claims, 13 Drawing Sheets

(51) Int. Cl.

| | |
|---|---|
| ***H04H 60/72*** | (2008.01) |
| ***H04H 60/73*** | (2008.01) |
| ***H04H 60/82*** | (2008.01) |

(56) References Cited

U.S. PATENT DOCUMENTS

| | | | | |
|---|---|---|---|---|
| 5,652,613 | A * | 7/1997 | Lazarus | H04N 1/00098 348/460 |
| 5,760,821 | A * | 6/1998 | Ellis | H04N 1/00098 348/569 |
| 5,870,725 | A * | 2/1999 | Bellinger et al. | 705/45 |
| 5,917,481 | A * | 6/1999 | Rzeszewski | H04N 5/44543 348/569 |
| 6,020,880 | A * | 2/2000 | Naimpally | H04N 7/163 348/E7.061 |
| 6,182,287 | B1 * | 1/2001 | Schneidewend et al. | 725/48 |
| 6,209,131 | B1 | 3/2001 | Kim et al. | |
| 6,272,127 | B1 * | 8/2001 | Golden et al. | 370/352 |
| 6,314,571 | B1 * | 11/2001 | Ogawa | H04H 20/06 348/E5.1 |
| 6,405,372 | B1 * | 6/2002 | Kim | H04N 5/44543 348/553 |
| 6,421,067 | B1 * | 7/2002 | Kamen | G06F 3/04815 348/564 |
| 6,518,986 | B1 * | 2/2003 | Mugura | 715/810 |
| 6,522,342 | B1 * | 2/2003 | Gagnon | H04H 60/25 715/716 |
| 6,763,035 | B1 * | 7/2004 | Koskelainen | H04N 21/238 370/390 |
| 6,771,639 | B1 * | 8/2004 | Holden | 370/352 |
| 6,968,566 | B1 * | 11/2005 | Entwistle | H04N 5/44543 348/E5.105 |
| 7,031,326 | B1 * | 4/2006 | Shur et al. | 370/401 |
| 7,080,078 | B1 * | 7/2006 | Slaughter et al. | 707/10 |
| 7,181,526 | B1 * | 2/2007 | Bell et al. | 709/231 |
| 7,188,356 | B1 * | 3/2007 | Miura | H04N 21/6582 348/E5.099 |
| 7,200,597 | B1 * | 4/2007 | Grizzard | 707/10 |
| 7,373,650 | B1 * | 5/2008 | Rodriguez | H04N 5/44591 348/565 |
| 7,472,352 | B2 * | 12/2008 | Liversidge et al. | 715/758 |
| 8,104,062 | B2 * | 1/2012 | Terakado | H04N 5/44 725/39 |
| 8,245,257 | B1 * | 8/2012 | Stettner | H04N 5/44543 725/109 |
| 2001/0037500 | A1 * | 11/2001 | Reynolds et al. | 725/36 |
| 2002/0007488 | A1 * | 1/2002 | Kikinis | H04H 60/72 725/40 |
| 2002/0073426 | A1 * | 6/2002 | Bhatt | H04N 5/4401 725/46 |
| 2002/0083468 | A1 * | 6/2002 | Dudkiewicz | 725/133 |
| 2002/0135698 | A1 * | 9/2002 | Shinohara | H04H 60/07 348/473 |
| 2002/0161634 | A1 * | 10/2002 | Kaars | G06Q 30/02 705/14.55 |
| 2002/0194600 | A1 * | 12/2002 | Ellis | H04N 5/44543 725/41 |
| 2002/0199192 | A1 * | 12/2002 | Donnelly | 725/40 |
| 2003/0051246 | A1 * | 3/2003 | Wilder | H04N 5/44543 725/49 |
| 2003/0093485 | A1 * | 5/2003 | Dougall et al. | 709/208 |
| 2003/0100325 | A1 * | 5/2003 | Paila et al. | 455/506 |
| 2003/0147390 | A1 * | 8/2003 | Rizzo et al. | 370/390 |
| 2003/0188313 | A1 * | 10/2003 | Ellis | A63F 13/12 725/60 |
| 2003/0208760 | A1 * | 11/2003 | Sugai | H04H 60/07 725/50 |
| 2004/0056096 | A1 | 3/2004 | Gurevich et al. | |
| 2004/0078817 | A1 * | 4/2004 | Horowitz | H04N 5/782 725/58 |
| 2005/0002649 | A1 * | 1/2005 | Boyle | H04N 5/44543 386/297 |

FOREIGN PATENT DOCUMENTS

| | | |
|---|---|---|
| EP | 1246057 | 10/2002 |
| JP | 2000-287141 | 10/2000 |
| JP | 2001-054034 | 2/2001 |
| JP | 2001-54034 | 2/2001 |

OTHER PUBLICATIONS

Smyth, Barry, et al., "Personalized Electronic Program Guides for Digital TV", AI Magazine, vol. 22, No. 2, AAIA, Spring 2001, pp. 89-98.*

"Session Announcement Protocol;" M. Handley et al; RFC 2974; IETF, Oct. 2000.

"Session Description Protocol;" M. Handley et al; RFC 2327; IETF; Apr. 1998.

"Describing Session Directories in SDP;" Ross Finlayson; Internet Draft, IETF, Jan. 24, 2001.

"Towards Multicast Session Directory Services;" A. Santos et al.

"Declarative Data Essence—Unidirectional Hypertext Transport Protocol;" SMPTE 364M-2001.

"Enhanced Content Specification;" Advanced Television Enhancement Forum; Appendix C; 1998, 1999.

"The MIME Multipart/Related Content-type;" E. Levinson; RFC 2387; IETF, Aug. 1998.

"Asynchronous Layered Coding Protocol Instantiation;" M. Luby et al; Internet-Draft, IETF, Apr. 25, 2002.

"Reliable Multicast Transport Building Blocks for One-to-Many Bulk-Data Transfer;" B. Whetten et al; RFC 3048; IETF; Jan. 2001.

"Layered Coding Transport (LCT) Building Block;" M. Luby et al; RFC 3451, IETF; Dec. 2002.

Japanese Office Action for corresponding JP Application No. 2005-502465, Aug. 7, 2009, Japan.

Japanese Office action for corresponding JP App. No. 2005-502465 dated Mar. 23, 2010, pp. 1-11.

http://www.dvb-h.org/PDF/a099.tm3348r2.cbms1199r14.IPDC_ESG.pdfIP Datacast over DVB-H: Electronic Service Guide(ESG), Nov. 2005, pp. 1,6-8,10. Accessed: Apr. 20, 2010.

Chinese Office action for corresponding CN App. No. 200380108784.X dated Aug. 16, 2010, pp. 1-11.

European Office action for corresponding EP app. No. 03 772 570.2-2202 dated Sep. 17, 2010, pp. 1-4.

Chinese Office action for corresponding CN App. No. 200380108784.X dated Apr. 25, 2011, pp. 1-5.

Chinese Office Action for CN Application No. 200380108784.X dated Nov. 3, 2011, pp. 1-7.

Chinese Office Action for related Chinese Application No. 200380108784.X dated Mar. 2, 2012, pp. 1-6.

Chinese Office Action for related Chinese Application No. 200380108784.X, dated Apr. 9, 2014, with English-language summary,14 pages.

* cited by examiner

METHOD AND APPARATUS OF ANNOUNCING SESSIONS TRANSMITTED THROUGH A NETWORK

CROSS REFERENCE TO RELATED APPLICATIONS

This application is for entry into the U.S. national phase under §371 for International Application No. PCT/IB03/05468 having an international filing date of Nov. 27, 2003, and from which priority is claimed under all applicable sections of Title 35 of the United States Code including, but not limited to, Sections 120, 363 and 365(c), and which in turn claims priority to UK application 0315286.7 filed on Jun. 30, 2003 and UK application 0229477.5 filed on Dec. 18, 2002.

FIELD OF INVENTION

The present invention relates to a method of announcing sessions particularly, although not exclusively to a method of announcing multimedia service sessions through a multicast network.

BACKGROUND ART

Audio, video and other types of data may be transmitted through a variety of types of network according to many different protocols. For example, data can be transmitted through a collection of networks usually referred to as the "Internet" using protocols of the Internet protocol suite, such as Internet Protocol (IP) and User Datagram Protocol (UDP).

Data is often transmitted through the Internet addressed to a single user. However, it can be addressed to a group of users. This is known as "multicasting".

One way of multicasting data is to use an IP datacasting network. Through such an IP-based broadcasting network, one or more service providers can supply different types of IP services including on-line newspapers, radio, television and download of music songs, videos, pictures, games and software. These IP services are organised into sessions, each session comprising one or more media streams in the form of audio, video and/or other types of data.

To determine when and where these sessions occur, users refer to an electronic service guide (ESG). One example used in DVB is an electronic program guide (EPG). The electronic service guide is usually divided up into parts and transmitted to users.

This approach, however, has several drawbacks. On the one hand, if any sessions are updated, then the user usually has to wait until a new version of the service guide has been received before they receive notification of updated sessions. On the other hand, few sessions are usually updated. Therefore, much of the data received by the user is superfluous. This is wasteful both in terms of processing power and electrical power, both of which tend to be in short supply in battery-powered mobile terminals.

The present invention seeks to provide an improved method of announcing sessions transmitted through a network.

SUMMARY OF THE INVENTION

According to a first aspect of the present invention there is provided a method of announcing sessions transmitted through a network, the method comprising providing a first set of announcements describing a plurality of sessions and providing a second set of announcements describing at least one updated session.

This has the advantage that it is possible to choose whether to be provided with the first set of announcements describing the plurality of sessions or to be provided with the second set of announcements describing any updated sessions. This allows updated sessions to be announced more quickly and efficiently.

An updated session may be a new session which is added to the plurality of sessions, a one of the plurality of sessions in which content is added, changed or deleted or a session which is deleted from the plurality of sessions.

Providing the first set of announcements and providing the second set of announcements may comprise providing the first set of announcements through a first channel and providing the second set of announcements through a second, different channel.

Providing the first set of announcements and providing the second set of announcements may comprise providing the first set of announcements through a first address, preferably a destination address, such as a first multicast IP address, and providing the second set of announcements through a second, different address, preferably a destination address, for example a second, different multicast IP address, respectively.

Providing the first set of announcements and providing the second set of announcements may comprise providing the first set of announcements through a first port number and providing the second set of announcements through a second, different port number respectively.

Providing the first set of announcements and providing the second set of announcements may comprise providing the first set of announcements through a first logical channel and providing the second set of announcements through a second, different logical channel respectively.

Providing the first set of announcements and providing the second set of announcements may comprise including in each announcement of the first set of announcements data for identifying the announcement as an announcement which describes a one of the plurality of sessions and in each announcement of the second set of announcements data for identifying the announcement as an announcement which describes a one of the at least one updated session.

Providing the first set of announcements and providing the second set of announcements may comprise including in each announcement of the first set of announcements respective data for specifying a position of a corresponding session within a first portion of a session directory and including in each announcement of the second set of announcements respective data for specifying a position of a corresponding session within a second portion of the session directory.

Providing the first set of announcements and providing the second set of announcements may comprise providing the first set of announcements through a first physical channel and providing the second set of announcements through a second, different physical channel respectively.

Providing the first set of announcements and providing the second set of announcements may comprise providing the first set of announcements through a first network and providing the second set of announcements through a second, different network respectively.

The method may further comprise providing a third set of announcements describing another plurality of sessions including the at least one updated session.

The method may comprise providing the first set of announcements through a first channel, providing the second set of announcements describing at least one updated session through a second, different channel and providing a third set of announcements describing another plurality of sessions including the at least one updated session through the first channel.

The method may comprise arranging the providing of said second set of announcements after the providing of said first set of announcements.

The method may comprise arranging the providing of said first set of announcements and the providing of said third set of announcements at substantially during an overlapping or same time periods.

Providing the first set of announcements and providing the second set of announcements may comprise transmitting the first set of announcements through the first channel and transmitting the second set of announcements through the second, different channel.

The method may comprise transmitting the first set of announcements according to a session announcement protocol (SAP), unidirectional hypertext transfer protocol (UHTTP), asynchronous layered coding (ALC) protocol or similar unidirectional protocol based on user datagram protocol (UDP). The method may comprise including a description of a corresponding session in each announcement, for example arranged according to session description protocol (SDP).

The method may comprise providing means for determining whether all of the first set of announcements have been provided, for example by providing the first set of announcements as a series of linked messages.

The method may comprise providing the first set of announcements in a first set of time slots and providing the second set of announcements in a second set of time slots, each timeslot of the first set of timeslots being provided at a different time from each timeslot of the second set of timeslots. The method may comprise multiplexing the first and second sets of announcements.

The method may further comprise providing a third set of announcements identifying the at least one updated session. Providing the second set of announcements describing the at least one updated session may comprise providing a set of announcements identifying the at least one updated session. Providing the second set of announcements describing the at least one updated session may further comprise including a description of a corresponding session. Providing the second set of announcements describing the at least one updated session may comprise providing a set of notifications pointing to the at least one updated session.

According to another aspect of the present invention there is provided a method of announcing sessions transmitted through a network, the method comprising providing a first set of announcements describing a plurality of sessions and providing a second set of announcements identifying at least one updated session.

The method may further comprise providing a third set of announcements describing the at least one updated session. The method may comprise transmitting at least one of the sets of announcements according to asynchronous layered coding (ALC) protocol. The method may comprise transmitting at least one of the sets of announcements according to a protocol based on asynchronous layered coding (ALC) protocol. The method may comprise defining an asynchronous layered coding (ALC) protocol session and defining at least one ALC channel. The method may comprise transmitting a set of metadata for describing the plurality of sessions via a first ALC channel. The method may comprise transmitting a set of metadata for describing at least one updated session via a second, different ALC channel. The method may comprise transmitting a set of metadata for identifying the at least one updated session via a third, different ALC channel. The method may comprise transmitting a set of metadata as a transport object. The method may further comprise defining a respective delivery table relating to the transport object and transmitting the delivery table.

According to a second aspect of the present invention there is provided a computer program product having program code stored on a readable medium so that, when executed by data processing apparatus, causes the data processing apparatus to perform a method of announcing sessions transmitted through a network.

According to a third aspect of the present invention there is provided a method of accessing sessions transmitted through a network, the method comprising selectively receiving a first set of announcements describing a plurality of sessions; and selectively receiving a second set of announcements describing at least one updated session.

The method may further comprise determining whether all of said first set of announcements have been received. The method may further comprise selecting not to receive further said first set of announcements and selecting to receive said second set of announcements. The method may further comprise selecting not to receive a third set of announcements describing another plurality of sessions including said at least one updated session. The method may further comprise selecting to receive a fourth set of announcements describing at least one further updated session.

The method may comprise using the second set of announcements to identify said at least one updated session. The method may comprise selecting to receive another set of announcements including a description of said at least one updated session. The method may comprise obtaining a description of said at least one updated session.

According to another aspect of the present invention there is provided a method of accessing sessions transmitted through a network, the method comprising selectively receiving a first set of announcements describing a plurality of sessions and selectively receiving a second set of announcements identifying at least one updated session. The method may further comprise selectively receiving a third set of announcements describing said at least one updated session.

According to a fourth aspect of the present invention there is provided a method of accessing sessions transmitted through a network, the method comprising listening to a first set of announcements describing a plurality of sessions, determining whether said first set of announcements have been received; if said first set of announcements have been received, then stopping listening to said first set of announcements and listening to a second set of announcements describing at least one updated session.

The method may further comprise stopping listening to a third set of announcements describing a further plurality of sessions including said at least one updated session.

According to a fifth aspect of the present invention there is provided apparatus for announcing sessions transmitted through a network, the apparatus comprising means for providing a first set of announcements describing a plurality of sessions and means for providing a second set of announcements describing at least one updated session.

According to a sixth aspect of the present invention there is provided apparatus for performing the method.

According to a seventh aspect of the present invention there is provided apparatus for announcing sessions transmitted through a network, the apparatus comprising a first transmitter for providing a first set of announcements describing a plurality of sessions and a second transmitter for providing a second set of announcements describing at least one updated session.

The apparatus may comprise means for managing an electronic service guide for announcing sessions to be transmitted through the network, means for managing content of sessions to be transmitted through the network, means for storing and electronic service guide for announcing sessions to be transmitted through the network, means for storing content of sessions to be transmitted through the network, means for determining changes to an electronic service guide, the changes corresponding to updated sessions to be transmitted through the network, a server for providing information relating to changes to an electronic service guide, the changes corresponding to updated sessions to be transmitted through the network, a server for providing content and/or means for transmitting data.

According to an eighth aspect of the present invention there is provided apparatus for accessing sessions transmitted through a network, the apparatus comprising means for selectively receiving a first set of announcements describing a plurality of sessions and means for selectively receiving a second set of announcements describing at least one updated session.

The apparatus may comprise means for determining whether said first set of announcements has been received the apparatus being configured such that if the determining means determines that the first set of announcements has been received, then the means for selectively receiving said second set of announcements is configured to receive the second set of announcements.

The apparatus may comprise means for selectively receiving a third set of announcements describing another plurality of session including the at least one updated session, the apparatus being configured such that if said determining means determines that the first set of announcements has been received, then the means for selectively receiving the third set of announcements is configured not to receive or not to forward the third set of announcements.

The apparatus may comprise means for receiving data, means for filtering an electronic service guide for announcing sessions to be transmitted through the network, means for storing an electronic service guide for announcing sessions to be transmitted through the network, means for browsing an electronic service guide for announcing sessions to be transmitted through the network, means for filtering content, means for storing content and/or means for browsing content.

The apparatus may be a handheld mobile communications device.

According to a ninth aspect of the present invention there is provided a system for presenting program schedule data on a display, said system comprising at least two announcements, the schedule data being organized at least partly from a first set of announcements describing at least partly a plurality of sessions and at least partly from a second set of announcements describing at least one at least partly updated session.

According to an tenth aspect of the present invention there is provided a system for presenting program schedule data on a display, said system comprising at least two announcements, the schedule data being organized at least partly from a first set of repeatable announcements describing a plurality of sessions, at least partly from a second set of repeatable announcements describing at least one at least partly updated session and at least session descriptions of at least one of the repeatable announcements for defining whether the at least one of the first and second announcements is received or not.

According to a eleventh aspect of the present invention there is provided a system for delivering program schedule data to end-user terminals, said system comprising two sets of announcements, each set comprising at least one announcement, the schedule data being organized at least partly from a first set of announcements describing at least partly a plurality of sessions and at least partly from a second set of announcements describing at least one at least partly updated session.

According to a twelfth aspect of the present invention there is provided a system for presenting program schedule data to end-user terminals, said system comprising at least two set of announcements, each set comprising at least one announcement, the schedule data being organized at least partly from a first set of repeatable announcements describing a plurality of sessions, at least partly from a second set of repeatable announcements describing at least one at least partly updated session and at least session descriptions of at least one of the repeatable announcements for defining whether the at least one of the first and second announcements is received or not.

The second set of announcements may include a version number of each updated session for allowing a client to detect if they have missed an earlier update. If a client detects it has missed an earlier update and is not currently receiving the first set of announcements, the client may start receiving the first set of announcements until it has received a full and latest version of the program schedule data. If the client detects that it has received a full and latest version of the program schedule data, it may stop receiving the first set of announcements and continues receiving only the second set of announcements. If the client detects it has missed an earlier update, it may fetch a full and latest version of the program schedule data over an interactive network. Each set of repeatable announcements may be divided into segments before transmission and a location of each segment within a whole transfer may be indicated in a framing field of each respective segment; the indicated location may enable clients to determine whether they have received all segments that constitute a given set or whether they need to wait for receiving more segments.

The program schedule data may be viewed either directly by a human end-user or automatically used by a software application. The program schedule data may be presented progressively to a human end-user or made progressively available to an automatic software application as the said data is being received. The program schedule data may be viewed by a human end-user via a graphical user interface. The program schedule data may be used by a personal video recorder.

BRIEF DESCRIPTION OF THE DRAWINGS

Embodiments of the present invention will now be described by way of example with reference to the accompanying drawings in which.

DETAILED DESCRIPTION OF THE INVENTION

Multicasting System 1

Figure 1:
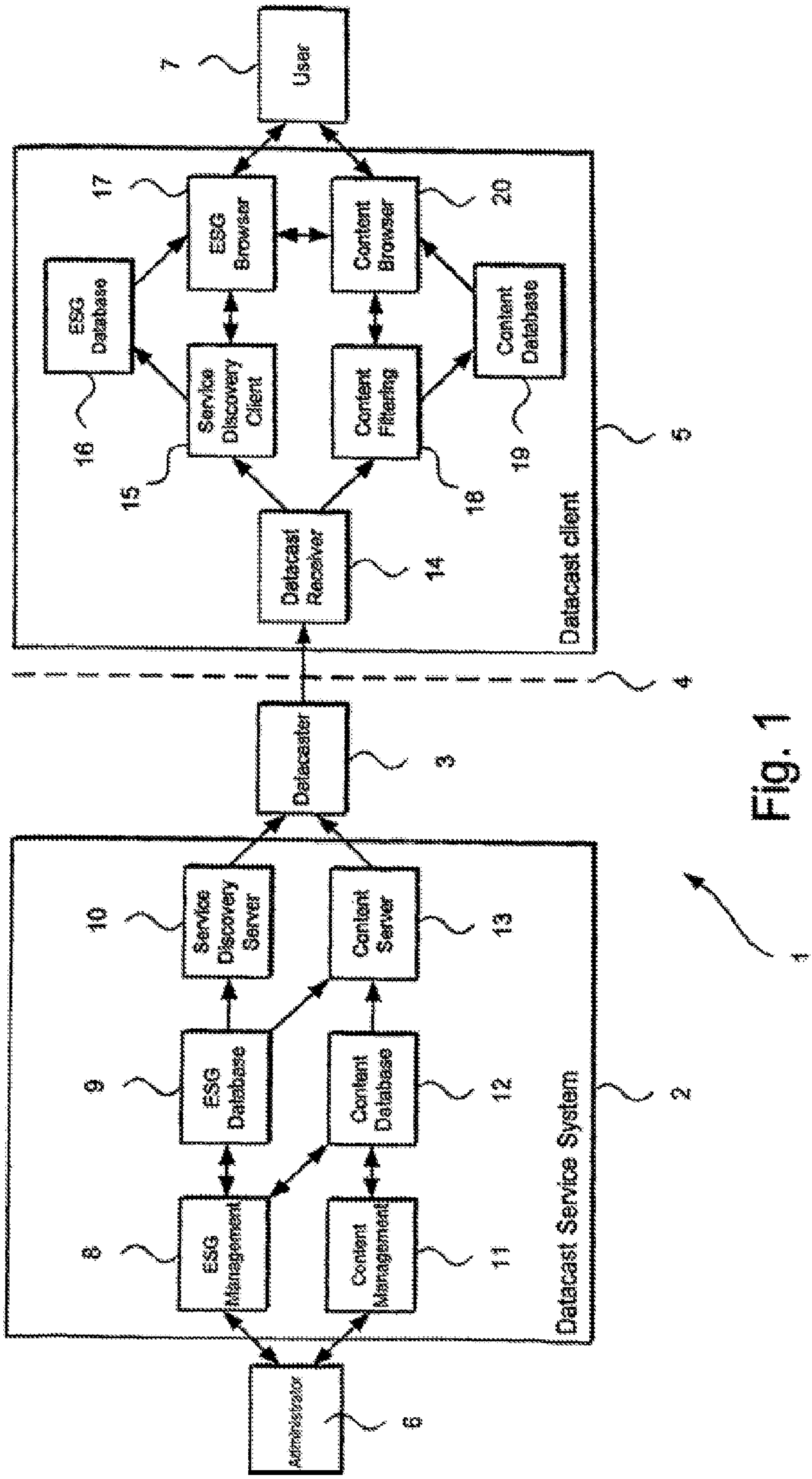
FIG. 1 is a schematic diagram of a multicasting system 1.

Referring to FIG. 1, a multicasting system 1 is shown. In this example, the multicasting system 1 is an internet protocol (IP) datacast system. The multicasting system 1 may include a datacast service system 2, a datacaster 3, a datacast network 4 and a plurality of clients 5. For clarity, only one client 5 is shown.

An administrator 6 provides scheduled content, such as audio, video and/or other types of data, for datacasting to clients 5 and provides metadata for describing the content. The metadata includes information regarding transmission of content.

The datacast service system 2 generates IP streams carrying content items and related metadata for datacasting to clients 5. The datacaster 3 receives IP streams from the datacast service system 2, provides Layer 2 encapsulation and modulation and transmits the IP data to clients 5 over the datacast network 4. The datacast network 4 is a point-to-multipoint network for delivering IP-based data. Typically, the datacast network 4 supports a plurality of simultaneous datacasts to clients 5. In this example, the datacast network 4 does not provide a return data path from the client 5 to the datacaster 3. The datacast network 5 may be for example a Digital Video Broadcasting (DVB) network, a Digital Audio Broadcasting (DAB) network, an Advanced Television Systems Committee (ATSC) network, an Integrated Services Digital Broadcasting (ISDB) network or a Wireless Local Area Network (WLAN). The client 5 comprises a terminal for receiving content and content descriptions over the datacast network 4 and presenting them to an end-user 7. The terminal may be fixed, such as a desk-top personal computer or a television set-top box, or portable, for instance a lap-top or notebook personal computer, personal digital assistant or mobile telephone handset which have receiving means for receiving broadcast transmissions.

The datacast service system 2 includes an electronic service guide (ESG) management module 8, an ESG database 9 for storing metadata for the electronic service guide, a service discovery server 10, a content management module 11, a contents database 12 for storing content for datacasting and a content server 13.

Electronic Service Guide (ESG) is a set of metadata describing available content such as e.g. streaming media and downloadable files with indication of their transmission schedules. The full or partial metadata of a single ESG is delivered to receiving clients in an ESG session that may comprise one or more channels.

The ESG management module 8 allows the administrator 6 to control metadata for describing datacast content. Content items can be grouped into IP services and IP sessions. Content items can be allocated (or de-allocated) time slots for transmission. Thus, the metadata describes the structure of content items as a hierarchy of IP services and IP sessions. The metadata may also include information on the transmission schedule of IP sessions and individual content items within IP sessions.

The content management module 11 allows the administrator 6 to add, replace and delete content items in the content database 12.

The service discovery server 10 generates announcements of IP services and IP sessions based on the metadata found in the ESG database 9. The announcements are sent to the datacaster 3 for transmission over the datacast network 4. The announcements may be transmitted repetitively by repeating them in carousel style or by transmitting them multiple times.

As will be explained in more detail later, two kinds of announcements are generated. A first kind of announcement describes a full IP service directory and a second kind of announcement describes updates to the IP service directory.

In one embodiment of the present invention, the second kind of announcements is used to transmit an updated session directory.

In another embodiment of the present invention, the second kind of announcements comprises identification of those parts of the service directory that have been changed. The second kind of announcements may comprise only such identification. Such second kind of announcements may be regarded as a notification of updates. The second kind of announcement comprising only notification of updates can be sent more frequently than the second kind of announcements comprising updates. The second kind of announcements may comprise both one or more notifications of updates and one or more updates, whereby the updates are selected from the set of updates available at the time of the announcement.

The content server 13 retrieves scheduling information from the ESG database 9 and, based on the scheduling information, retrieves content from the content database 12 and sends it to the datacaster 3 for transmission over the datacast network 4.

The client 5 includes a datacast receiver 14, a service discovery client 15, an ESG database 16 for storing metadata for the electronic service guide, an ESG browser 17, a content filtering application 18, a content database 19 and a content browser 20.

The datacast receiver 14 receives data over the datacast network 4 whereupon it demodulates and decapsulates the data. In this case, the datacast receiver 14 forwards the demodulated and decapsulated data to an IP stack (not shown). The demodulated and decapsulated data comprises IP packets carrying content streams or metadata describing content. The IP packets are forwarded from the stack (not shown) to IP-based applications 15, 18 running on the client 5.

The service discovery client 15 receives the IP packets on one or more given addresses and one or more given ports for carrying IP service announcements; As will be explained in more detail later, the service discovery client 15 can receive announcements of the first type describing the full service directory and, either alternatively or additionally, announcements of the second type describing updates to service directory. The IP packets carry-metadata which can be stored in the ESG database 16 or forwarded directly to the ESG browser 17.

The ESG database 16 has an information structure very similar to the server-side ESG database 9. The ESG database 16 is initially empty, for example when the client 5 is first switched on, but fills up and is updated as IP session announcements are received from the datacast service system 2.

The ESG browser 17 allows the end-user 7 to view schedules and descriptions of IP services, sessions and content items available from the datacaster service system 2. The ESG browser 17 can retrieve metadata from the ESG database 16 or receive metadata directly from the service discovery client 15.

The content filtering application 18 receives the IP packets on one or more given addresses and one or more given ports configured by the content browser 20 or other applications running on the client. The IP packets carry content which can be stored in the content database 19 or forwarded directly to the content browser 20.

The content browser 20 is loaded and run when the end-user 7 has selected a particular datacast content item for consumption. The content item can be received in real time or retrieved from the content database 19. The content browser 20 can be for example a Web browser, an MP3 player or a streaming video client.

The multicasting system 1 may allow automatic content uploading by external content providers (not shown) and forwarding of Internet-based content. The datacaster 3 can also deliver content to a plurality of datacast networks (not shown), each datacast network comprising one or more transponders.

In an embodiment of the present invention, one or more ESG proxies (not shown) may be provided between the datacaster 3 and the client 4. Each ESG proxy is capable of receiving and transmitting ESG metadata or parts of ESG metadata, updates and/or notifications of updates. Each ESG proxy can filter ESG metadata or parts thereof, including updates and notifications of updates from one or more ESG senders and output the filtered ESG metadata to one or more ESG sessions. Logically, an ESG proxy fits in between ESG senders and receivers. A proxy may also cache ESG metadata or parts thereof including updates and notifications of updates and may provide its own bandwidth control or congestion control schemes on the output.

Sessions

Figure 2:
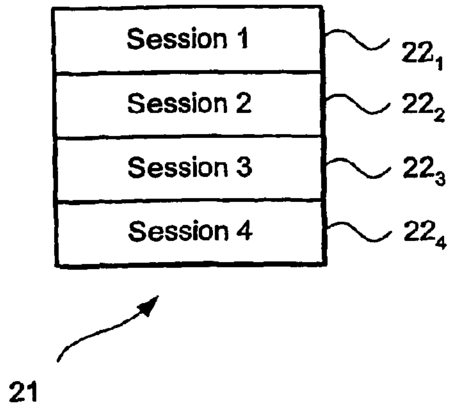
FIG. 2 shows content stored in a content database.

Referring to FIG. 2, content 21 is shown which is stored in the content database 12 and which includes first, second, third and fourth sessions $\mathbf{22}_1$, $\mathbf{22}_2$, $\mathbf{22}_3$, $\mathbf{23}_4$. The first, second and third sessions $\mathbf{22}_1$, $\mathbf{22}_2$, $\mathbf{22}_3$ comprise data relating to soccer. For example, the first session 22, may include text relating a game, the second session $\mathbf{22}_2$ include video streaming and the third session may include audio streaming $\mathbf{22}_3$. The fourth session $\mathbf{22}_4$ comprises data relating to hockey. A session $\mathbf{22}_1$, $\mathbf{22}_2$, $\mathbf{22}_3$, $\mathbf{23}_4$ may comprise a single IP stream or a plurality of IP streams.

Session Directory

Figure 3:
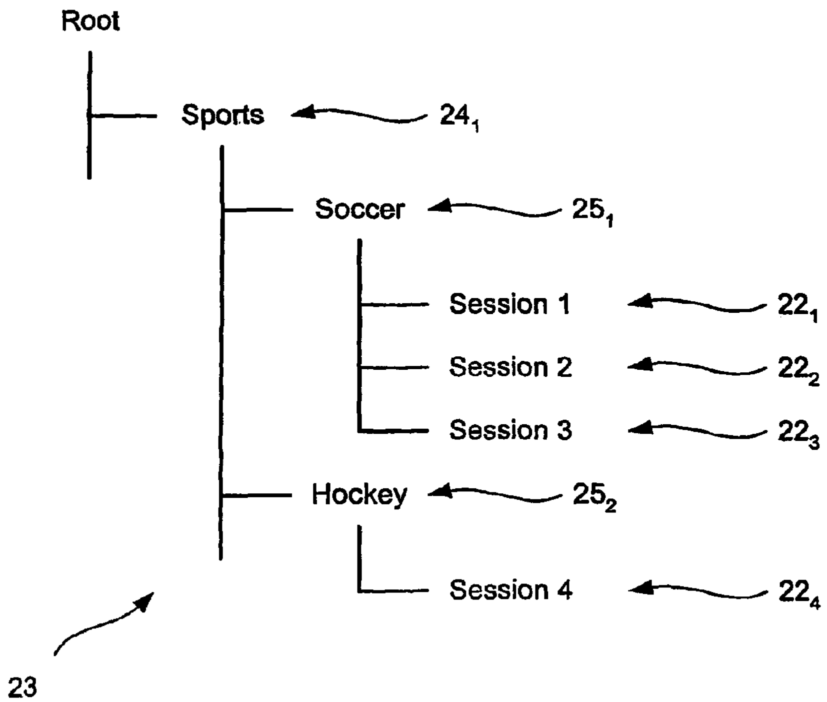
FIG. 3 shows a session directory.

Referring to FIG. 3, a session directory 23 is shown according to which the sessions $\mathbf{22}_1$, $\mathbf{22}_2$, $\mathbf{22}_3$, $\mathbf{22}_4$ are organised. The session directory 23 includes, at a first level, categories such as sports $\mathbf{24}_1$. Further examples of categories include arts, business, computers, games, news and shopping and other categories which are commonly found on web portal sites. Each category includes, at a second level, sub-categories, such as soccer $\mathbf{25}_1$ and hockey $\mathbf{25}_2$. Each sub-category may be further sub-divided. For instance, the soccer sub-category $\mathbf{25}_1$ can be divided into soccer leagues, each of which may be divided into league divisions and each of which in turn may be divided into players.

Each category, sub-category or further sub-category may include one or more sessions. For example, the soccer sub-category $\mathbf{25}_1$ includes the first, second and third sessions $\mathbf{22}_1$, $\mathbf{22}_2$, $\mathbf{22}_3$, while the hockey sub-category category $\mathbf{25}_2$ includes the fourth session $\mathbf{22}_4$.

Figure 4:
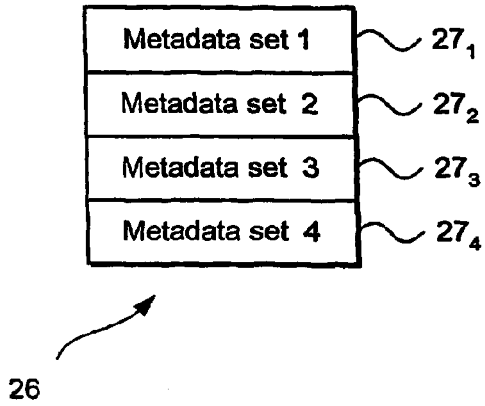
FIG. 4 shows electronic service guide data stored in an electronic service guide database.

Referring to FIG. 4, ESG data 26 is shown which is stored in the ESG database 9. The electronic service guide data 26 includes first, second, third and fourth sets of metadata $\mathbf{27}_1$, $\mathbf{27}_2$, $\mathbf{27}_3$, $\mathbf{27}_4$ for describing the first, second, third and fourth sessions $\mathbf{22}_1$, $\mathbf{22}_1$, $\mathbf{22}_3$, $\mathbf{22}_4$ respectively. The ESG data 26 reflects the structure of the session directory 22.

The ESG data 26 is transmitted to clients 5 so as to provide an ESG for users. However, there is a problem if the ESG data 26 needs to be updated, as will now be explained:

Referring to FIGS. 1, 2, 3 and 4, initially, ESG data 26 is transmitted from the datacast service system 2 to the client 5. The datacast service system 2 sends sets of metadata $\mathbf{27}_1$, $\mathbf{27}_2$, $\mathbf{27}_3$, $\mathbf{27}_4$ to the datacaster 3 to be transmitted to clients 5. The client 5 begins to receive the sets of metadata $\mathbf{27}_1$, $\mathbf{27}_2$, $\mathbf{27}_3$, $\mathbf{27}_4$ and starts to fill the initially empty ESG database 16. Eventually, all the sets of metadata $\mathbf{27}_1$, $\mathbf{27}_2$, $\mathbf{27}_3$, $\mathbf{27}_4$ are received and are stored in the ESG database 16. At this point, the ESG is complete.

Figure 5:
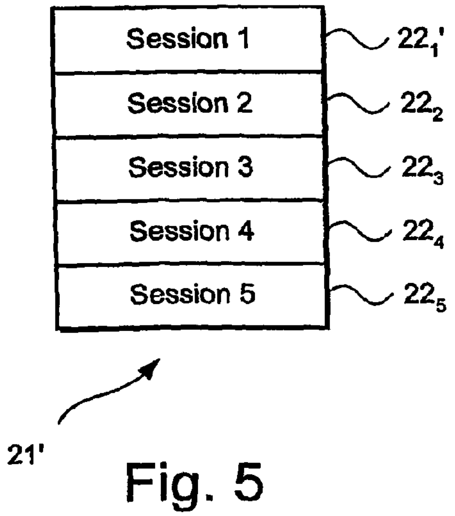
FIG. 5 shows updated content stored in a content database.

Referring to FIG. 5, the content database 12 is updated and corresponding updated content 21' is shown. The updated content 21' includes an updated session $\mathbf{22}_1$' and a new session $\mathbf{22}_5$. For example, the first session $\mathbf{22}_1$ may be updated by replacing a match preview with a match report. The new session $\mathbf{22}_5$ may be a text file with a hockey fixture list.

Figure 6:
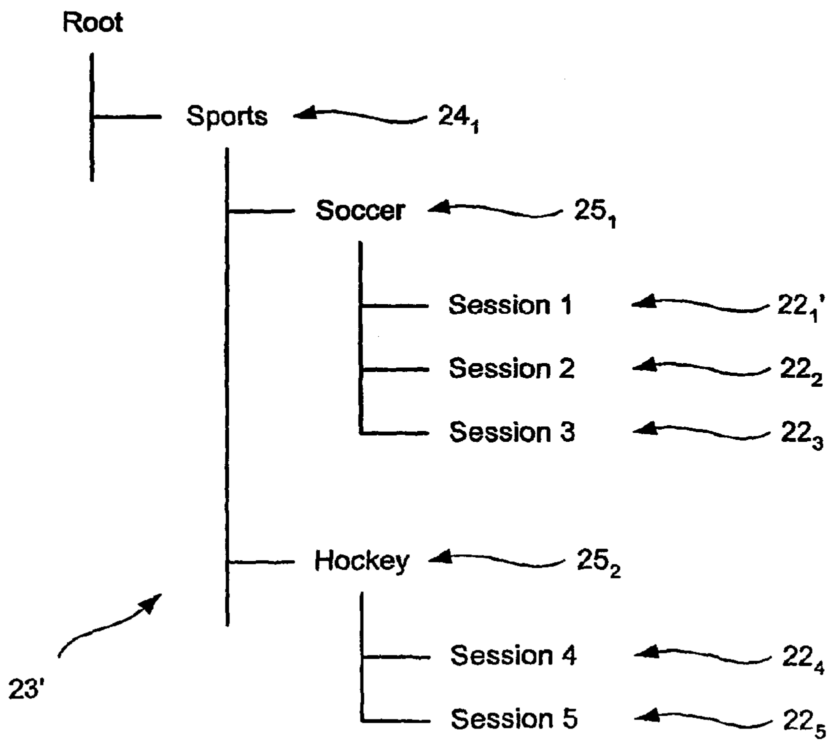
FIG. 6 shows an updated session directory.

Referring to FIG. 6, an updated session directory 23' is shown and includes the updated session 22$_1$' and the new session 22$_5$.

Figure 7:
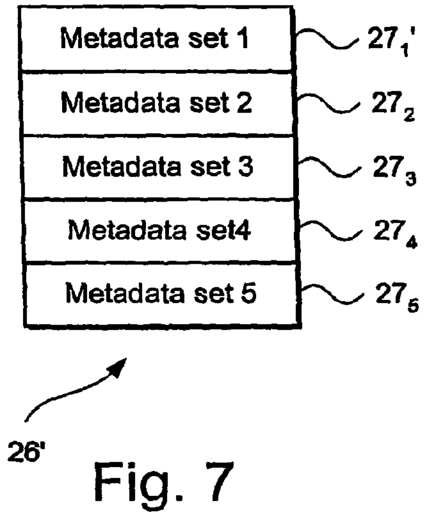
FIG. 7 shows updated electronic service guide data stored in an in an electronic service guide database.

Referring to FIG. 7, an updated ESG data 26' is shown including an updated first sets of metadata 27'$_1$, and a new set of metadata 27$_5$.

Referring to FIGS. 1, 4, 6 and 7, the updated ESG data 26' is transmitted from the datacast service system 2 to the client 5. The datacast service system 2 sends the updated. ESG data 26' to the datacaster 3 for transmission. The client 5 then receives updated sets of metadata 27$_1$, 27$_2$, 27$_3$, 27$_4$, 27$_5$. However, the client 5 does not know whether each set of metadata 27$_1$, 27$_2$, 27$_3$, 27$_4$, 27$_5$ relates to existing or updated sessions. Thus, each incoming set of metadata 27$_1$', 27$_2$, 27$_3$, 27$_4$, 27$_5$ is compared with stored sets of metadata 27$_1$, 27$_2$, 27$_3$, 27$_4$ to check whether they relate to an updated data session. Processing metadata in this way is wasteful. Furthermore, there can be delay between the first session 22$_1$ being updated and the electronic service guide at the client 5 being revised.

Therefore, it is desirable to provide an improved session directory and an improved ESG.

One solution to the problem is to split the session directory and divide transmission of the ESG accordingly. Description of the session directory is transmitted by sending two types of session announcements one for describing the full session directory and another for describing an updated session directory, as will now be described in more detail:

Split Session Directory

First Example

Figure 8:
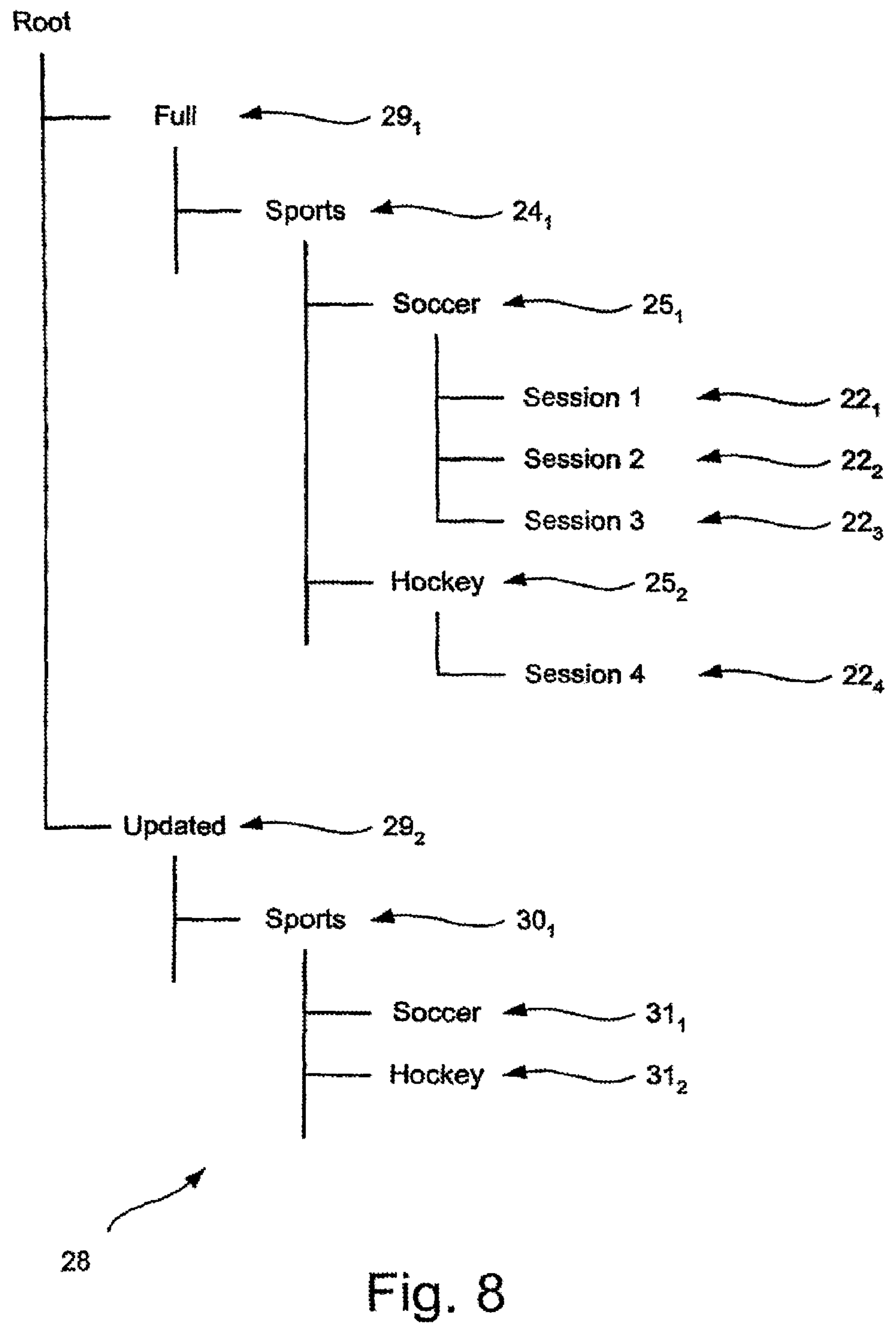
FIG. 8 shows a first embodiment of a session directory before an update according to the present invention.
Figure 9:
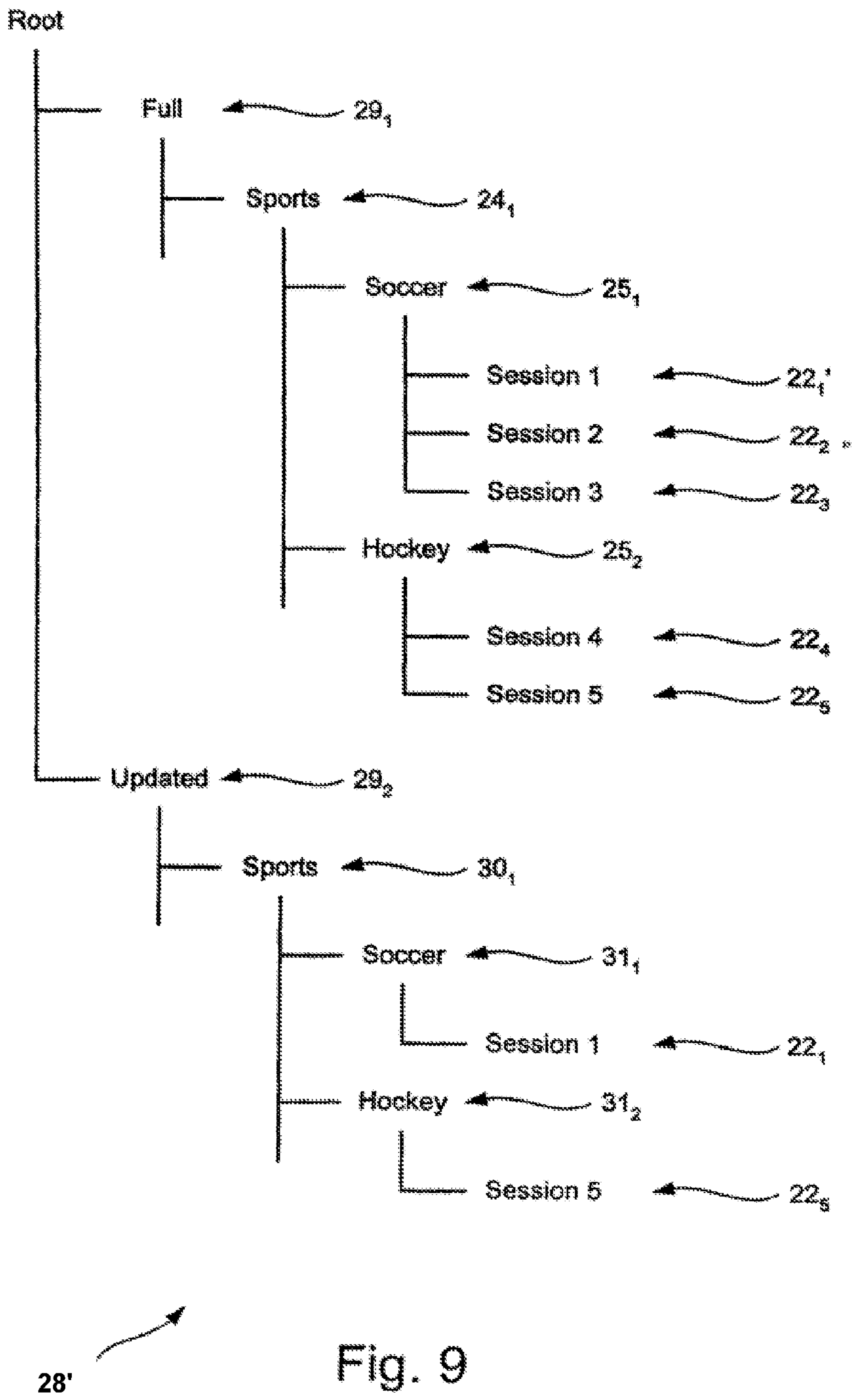
FIG. 9 shows the session directory shown in FIG. 8 after the update in accordance with the present invention.

Referring to FIGS. 8 and 9, a first embodiment of a session directory 28,28' according to the present invention is shown before and after an update respectively.

The session directory 28, 28' is split into two parts at a relatively high level, in this example above the category level, and the two parts are referred to as the full session directory 29$_1$ and the updated session directory 29$_2$ respectively. Later, in a second example, a session directory is described which is split at a relatively low level.

The full session directory 29$_1$ includes substantially the same categories described earlier, such as sports 24$_1$. Each category includes sub-categories, such as soccer 25$_1$ and hockey 25$_2$. Similarly, there may be further sub-categories. Each category, sub-category or any further sub-category may include one or more sessions. In this case, the soccer sub-category 25$_1$ includes the first, second and third sessions 22$_1$, 22$_2$, 22$_3$ and the hockey sub-category category 25$_2$ includes the fourth sessions 22$_4$.

The updated session directory 29$_2$ also includes categories which correspond to the categories in the full session directory, such as sports 30$_1$. Similarly, each corresponding category includes corresponding sub-categories, such as soccer 31$_1$ and hockey 31$_2$. Similarly, there may be corresponding further sub-categories. Each corresponding category, corresponding sub-category or any corresponding further sub-category may include, if there has been an update, one or more updated sessions.

Before the update, the updated session directory 29$_2$ does not list any sessions. After the update, the updated directory 29$_2$ lists updated sessions. In this case, the soccer sub-category 31$_1$ includes the updated, first session 22$_1$' and the hockey sub-category category 31$_2$ includes the fifth session 22$_5$.

This configuration is used to send two types of session announcements. One type of announcement is used to describe all sessions. Another type of announcement is used to describe updated sessions.

Thus, the client may listen initially to announcements of the fist type so as to receive a description of all the sessions, i.e. the full session directory. Once the client has received the description of all sessions, the client may listen only to announcements of the second type so as to learn of any updates to the sessions.

Session Announcements Using SAP and SDP

Figure 10:
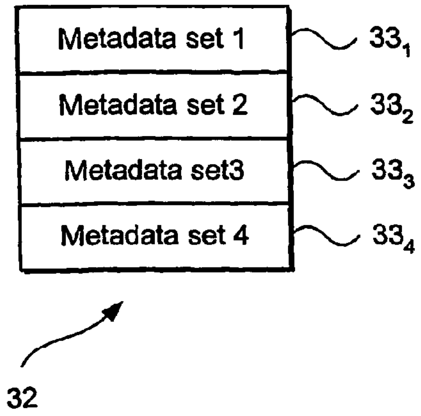
FIG. 10 shows electronic service guide data before an update in accordance with the present invention.
Figure 11:
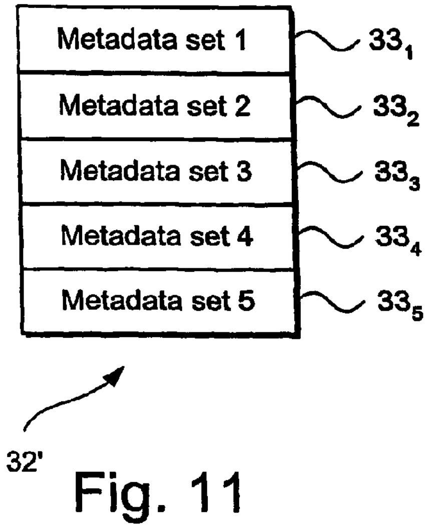
FIG. 11 shows electronic service guide data after an update in accordance with the present invention.

Referring to FIGS. 10 and 11, a first example of ESG data 32, 32' in accordance with the present invention is shown before and after the update.

The ESG data 32 includes first, second, third and fourth sets of metadata 33$_1$, 33$_2$, 33$_3$, 33$_4$ for describing the first, second, third and fourth sessions 22$_1$, 22$_2$, 22$_3$, 22$_4$ respectively.

The updated ESG 32' includes the updated first, second, third, fourth and fifth sets of metadata 33$_1$', 33$_2$, 33$_3$, 33$_4$, 33$_5$ for describing the updated first, second, third, fourth and fifth sessions 22$_1$ , 22$_2$, 22$_3$, 22$_4$, 22$_5$ respectively.

A Session Announcement Protocol (SAP) is used to transmit sets of metadata 33$_1$, 33$_1$', 33$_2$, 33$_4$, 33$_5$ to clients 5 and a Session Description Protocol (SDP) is used to describe the sessions 22$_1$, 22$_1$', 22$_2$, 22$_3$, 22$_4$, 22$_5$. Reference is made to "Session Announcement Protocol" by M. P. Maher, C. Perkins & E. Whelan, RFC 2974, IETF, October 2000 and to "Session Description Protocol" by M. Handley & V. Jacobson, RFC 2327, IETF, April 1998.

Figure 12:
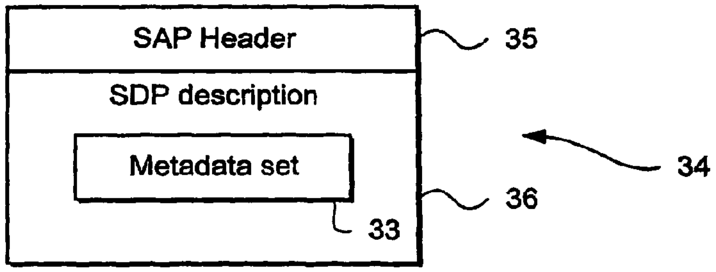
FIG. 12 shows a session announcement message using. SAP and SDP protocols in accordance with the present invention.

The use of the Session Announcement Protocol and the Session Description Protocol advantageously permits information describing the structure of session directories to be transmitted to clients 5. Reference is made to "Describing session directories in SDP" by R. Finlayson, Internet Draft, IETF, January 2001 and "Towards multicast session directory services" by A. Santos, J. Macedo & V. Freitas. Referring to FIG. 12, an embodiment of a session announcement 34 according to the present invention is shown. The session announcement 34 comprises an SAP header 35 and payload in the form of an SDP description 36 of a session. The SDP description 36 includes a set of metadata 33 for describing a session.

Figure 13:
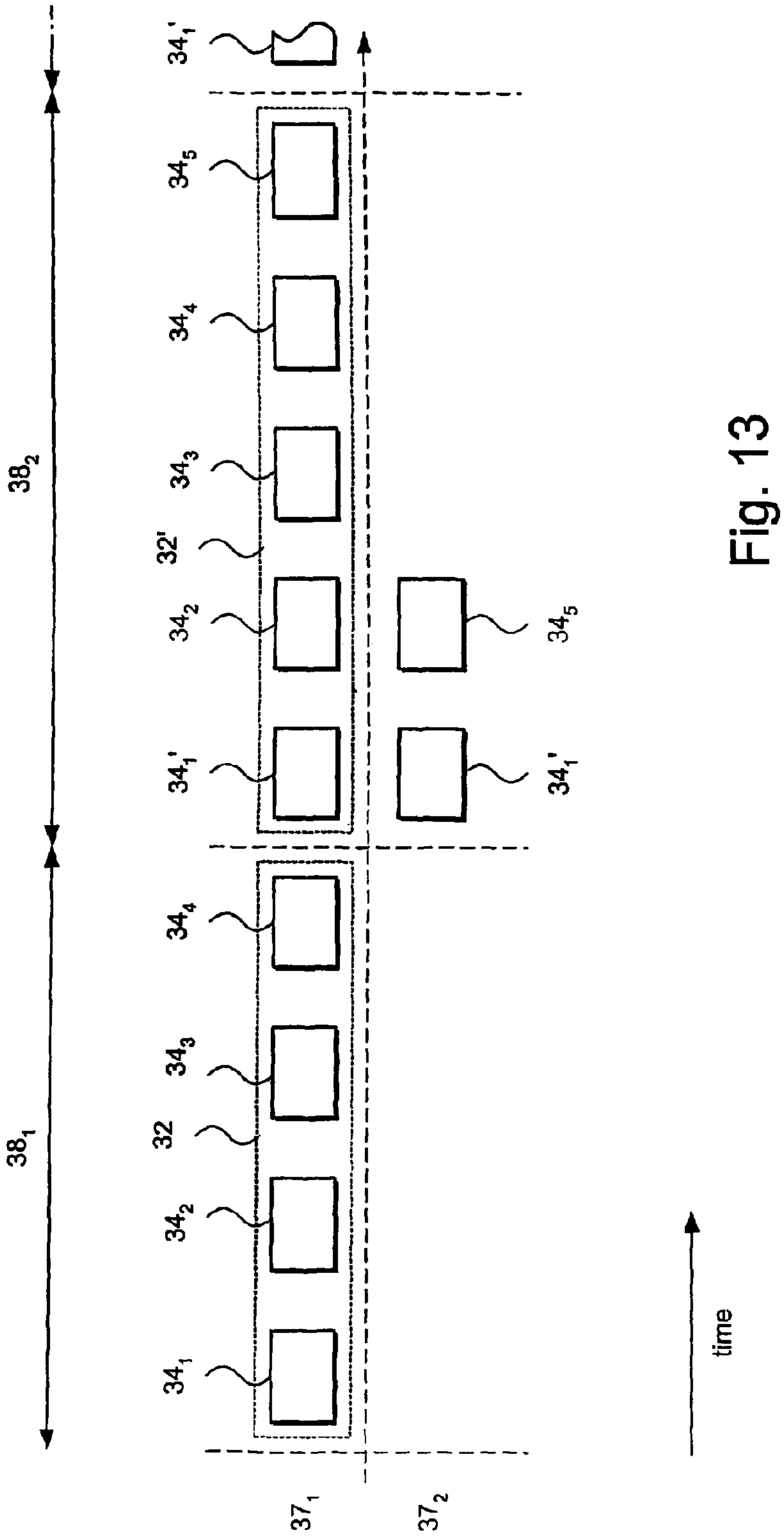
FIG. 13 illustrates transmission of a description of a session directory using session announcement messages shown in FIG. 12 in accordance with the present invention.

Referring to FIG. 13, in an embodiment of the invention, a description of the session directory 28 is transmitted by sending two types of session announcements 37$_1$, 37$_2$ each describing a session directory, in this case the full session directory 29$_1$ and the updated session directory 29$_2$ respectively.

The first type of session announcements 37$_1$ is used to send descriptions of all sessions, i.e. the full session directory 29$_1$. During an earlier cycle 38$_1$, the announcements 34$_1$, 34$_2$, 34$_3$, 34$_4$ describe all sessions 22$_1$, 22$_2$, 22$_3$, 24$_4$ before the update and, during a later cycle 38$_2$, the announcements 34$_1$', 34$_2$, 34$_3$, 34$_4$, 34$_5$ describe all sessions 22$_1$', 22$_2$, 22$_3$, 22$_4$, 22$_5$ after the update.

The second type of announcements 37$_2$ is used only to send descriptions of sessions that have been added, removed or changed since the transmission of announcements 34$_1$, 34$_2$, 34$_3$, 34$_4$ during the earlier cycle 38$_1$. In this example, no cycle precedes the earlier cycle 38$_1$. Thus, during the earlier cycle 38$_1$, there are no announcements of the second type 37$_2$. During the later cycle 38$_2$, the announcements 34$_1$', 34$_5$ describe updated sessions 22$_1$', 22$_5$ (FIG. 9).

Usually, there will be more than two cycles 38$_1$, 38$_2$ of announcements. Furthermore, more sessions may be updated. Thus, each subsequent cycle (not shown) may or may not include announcements of the second type $37_2$. Optionally, announcements of the second type $37_2$ may be sent repeatedly during a cycle to protect against irrecoverable transmission errors.

The structure of the session directory 28 (FIG. 9) may be described using a hierarchy of multicast IP addresses using SDP and SAP.

An embodiment of a process of describing the structure of the session directory 28 according to the present invention includes transmitting a first session announcement on a given multicast address. The first session announcement includes a second multicast address and other details relating to a session directory. The process includes transmitting a second session announcement on the second multicast address. The second session announcement includes a third multicast address and other details relating to a session sub-directory. Because sub-directories in turn can be used to announce a succeeding level of a session directory, the session directory hierarchy can be organized as a tree of any depth. In this example, a root or default session announcement (not shown) is transmitted on a widely known address, which specifies a pair of addresses for receiving announcements of the first and second types $37_1$, $37_2$ respectively.

One or more "category" fields may be included in the session announcements for allowing clients 5 to filter and organize session announcements.

As described earlier, announcements of the first type $37_1$ are transmitted on a first IP address, such as 224.2.17.0.

Referring to FIG. 13, the first session announcement $34_1$ may include an SDP description 36 of the first session $22_1$ including, for example:

v=0
o=jsmith 2890842807 2890844525 IN IP4 10.47.16.5
c=IN IP4 224.2.17.12/127
t=2892054126 2892399688
m=data 9875 UHTTP UDP
a=cat:Full.Sports.Soccer If the first session announcement $34_1$ is updated, then the updated first session announcement $34_1$' may include an SDP description 36 of the updated first session $22_1$' including, for example:

v=0
o=jsmith 2890842807 2890844526 IN IP4 10.47.16.5
c=IN IP4 224.2.17.12/127
t=2892054126 2892399726
m=data 9875 UHTTP UDP
a=eat:Full.Sports.Soccer Likewise, the second session announcement $34_2$ may include an SDP description 36 of the second session $22_2$ including, for example:

v=0
o=jsmith 2890842807 2890844526 IN IP4 10.47.16.5
c=IN IP4 224.2.17.13/127
t=2892054126 2892399726
m=video 9875 RTP/AVP 31
a=cat:Full.Sports.Soccer Announcements of the second type $37_2$ are transmitted on a second IP address, such as 224.2.17.1.

Referring still to FIG. 13, the updated first session announcement $34_1$' may include an SDP description 36 of the updated first session $22_1$' (FIG. 9) including for example:

v=0
o=Jsmith 2890842807 2890844526 IN IP4 10.47.16.5
c=IN IP4 224.2.17.12/127
t=2892054126 2892399726
m=data 9875 UHTTP UDP
a=cat:Update.Sports.Soccer The updated session $22_1$' (FIG. 9) may be identified as an updated session in a number of ways:

Firstly, the first session announcement $34_1$ and the updated first session announcement $34_1$' specify different version numbers in the "o=" field, namely may include comparing version numbers of the first and updated first session announcements $34_1$, $34_1$' and noting different version numbers.

Secondly, the updated first session announcement $34_1$' is provided through a different channel, in this case a different IP address, which is reserved for announcements relating to updated sessions. Thus, identifying an updated session may include receiving an announcement on a different channel.

Thirdly, the updated first session announcement $34_1$' includes a category field, which identifies the fact that the session announcement relates to an update. Thus, identifying an updated session may include determining whether an announcement identifies itself as relating to an update and/or determining a position within a session directory.

Method of Operating the Datacast Service System 2

Figure 14:
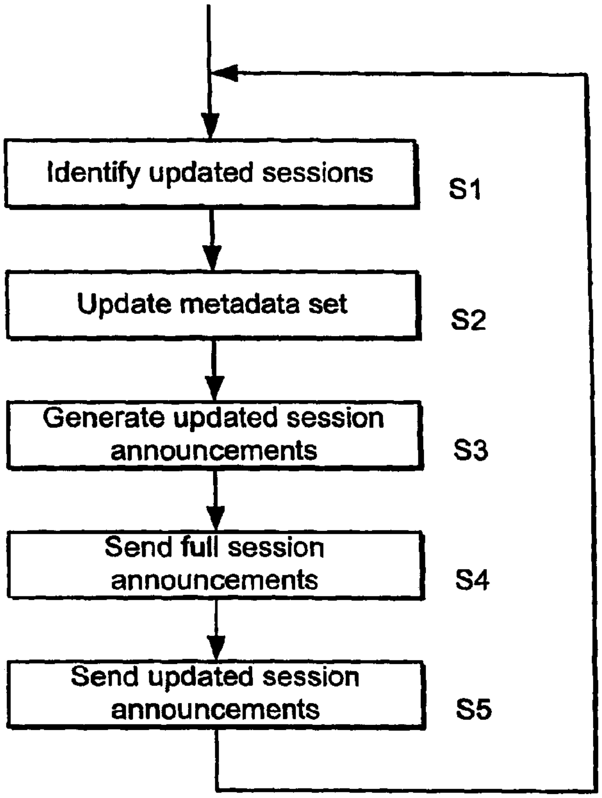
FIG. 14 is a process flow of a method of operating a datacast service system in accordance with the present invention.

Referring to FIGS. 1 and 14, an embodiment of a method of operating the datacast service system 2 according to the present invention is shown.

The ESG management module 8 identifies whether sessions have been updated in the content database 12 (step S1). If it identifies any updated sessions, then it updates corresponding sets of metadata in the ESG database (step S2). Updating may include adding or deleting metadata. Metadata is passed to the service discovery server 10, which generates updated session announcements for any updated sets of metadata (step S3). The service discovery server 10 forwards a first set of announcements describing a plurality of sessions, in other words full session announcements, and a second set of announcements describing at least one updated session, in other words updated session announcements, to the datacaster 3 through different channels, such as different IP addresses (steps S4 & S5). The datacaster 3 receives the announcements and transmits them over the datacast network 4 to each clients 5.

Method of Operating Client 5

Figure 15:
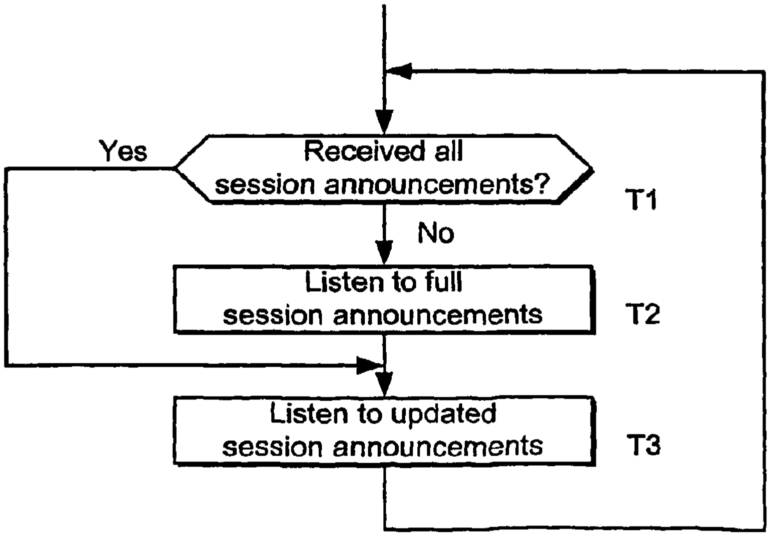
FIG. 15 is a process flow of a method of operating a datacast client in accordance with the present invention.

Referring to FIGS. 1 and 15, an embodiment of a method of operating the client 5 according to the present invention is shown.

The client 5 checks whether it has received all the session announcements of the first type $37_1$ (step T1). If not, the client 5 listens to both types of announcements $37_1$, $37_2$ (step T1& T2). However, if the client 5 has received all the session announcements of the first type $37_1$, then it can stop listening to announcements of the first type $37_1$ and continue listening only to announcements of the second type $37_2$. This has the advantage that it saves processing power and electrical power because fewer session announcements are received and/or processed.

The first and second types of announcements $37_1$, $37_2$ may include multicast addresses of announcements relating to other session directories, which in turn may include multicast addresses of announcements relating to further session directories.

Announcements of the first type $37_1$ may be considered as relating to a session directory including sub-directories to a given depth of directory hierarchy. Announcements of the second type $37_2$ may likewise be considered as relating to a session directory including sub-directories to a given depth of directory hierarchy. If announcements of either type $37_1$, $37_2$ relate to more than one session directory, then they can be used to announce the details of a different sub-tree of the IP session hierarchy. Thus, if descriptions of multiple sub-directories are transmitted using announcements of the first type $37_1$, then the client 5 may stop receiving announcements relating to a particular subdirectory as soon as it has received all the different session descriptions of that subdirectory.

Split Session Directory

Second Example

Figure 16:
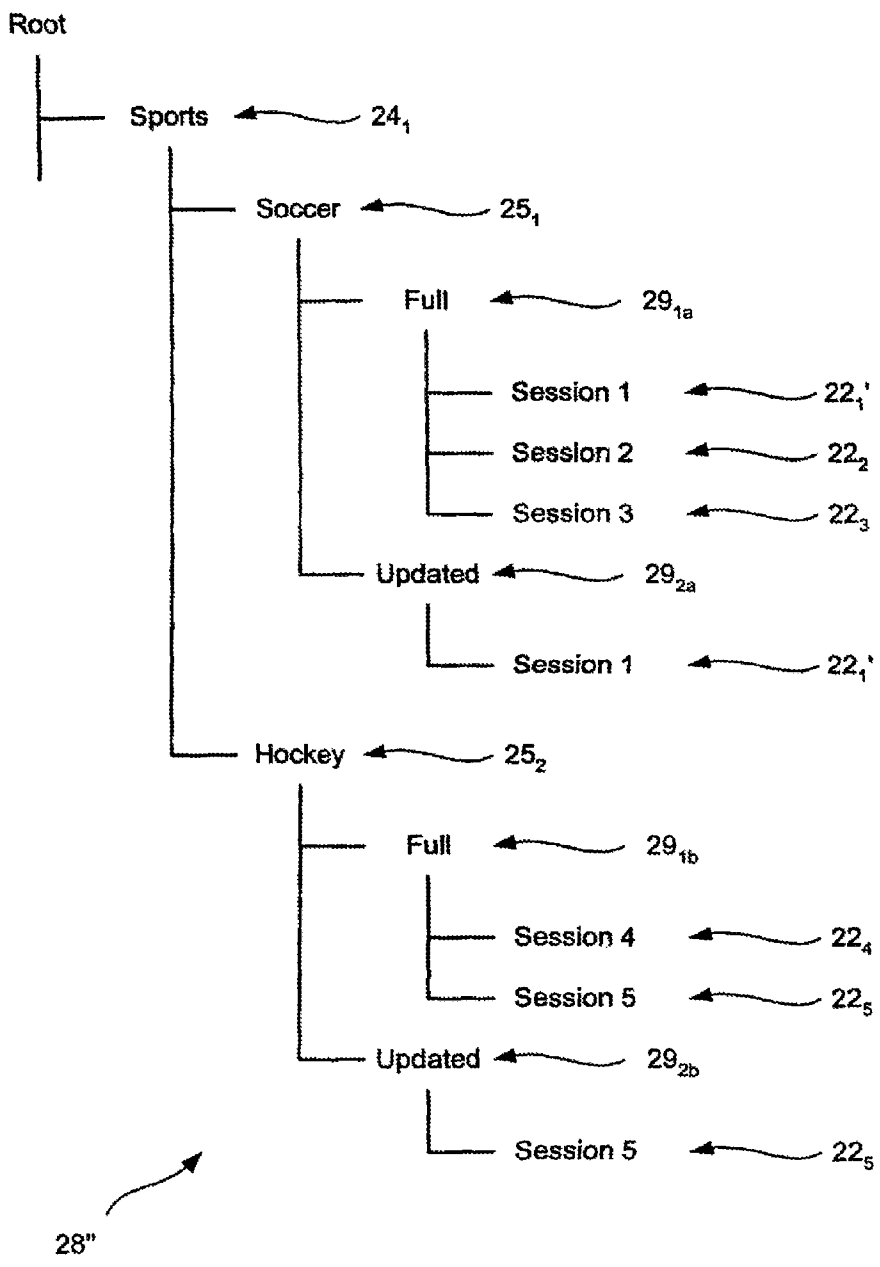
FIG. 16 shows a second embodiment of a session directory after an update in accordance with the present invention.

Referring to FIG. 16, a second embodiment of asession directory 28" according to the present invention is shown. The session directory 28" is split into two parts at a relatively low level, in this example above the session level, and the two parts are referred to as the full session directory $29_{1a}$, $29_{1b}$ and the updated session directory $29_{2a}$, $29_{2b}$ respectively.

The ESG data 32 and the updated ESG data 32' are modified to reflect the structure of the second embodiment of a session directory 28" according to the present invention.

Session Announcements Using UHTTP

A drawback of using session announcements employing SAP and SDP is that it is difficult for a client 5 to establish when it has received enough announcements of the first type $37_1$ to describe the full session directory $29_1$. Announcements $34_1'$, $34_2$, $34_3$, $34_4$, $34_5$ may be lost or corrupted and these protocols do not allow such events to be detected.

In an alternative embodiment, this problem is solved by linking together session announcements describing the full session directory $29_1$.

A Unidirectional Hypertext Transfer Protocol (UHTTP) is used to implement a concatenated transfer of multiple session descriptions and references are made to the Society of Motion Picture and Television Engineers standard SMPTE 364M-2001 "Declarative Data Essence—Unidirectional Hypettext Transport Protocol" and to "Appendix C: The Unidirectional Hypertext Transfer Protocol (UHTTP)" in Enhanced Content Specification, Advanced Television Enhancement Forum.

UHTTP supports MIME multipart/related content-type protocol, so allowing a single UHTTP transfer to comprise multiple independent MIME objects and reference is made to "The MIME Multipart/Related Content-type" by E. Levinson, RFC 2387, IETF (1998).

Figure 17:
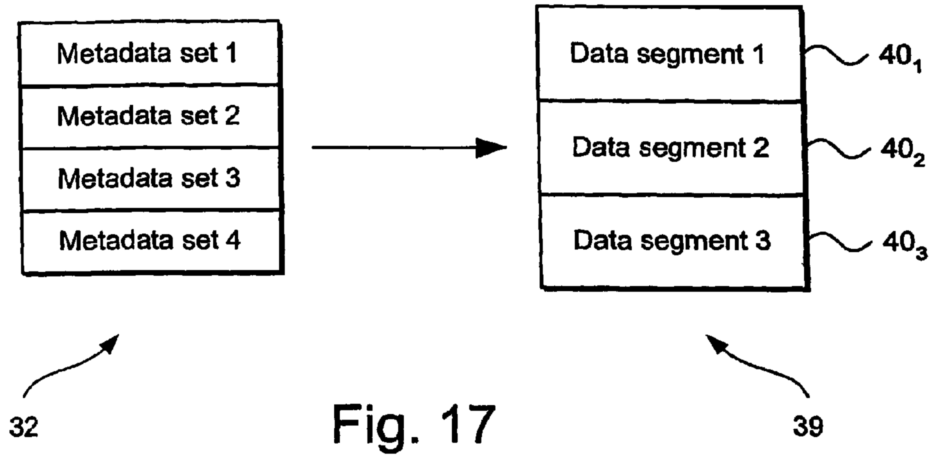
FIG. 17 shows splitting electronic service guide data into data segments in accordance with the present invention.

Referring to FIG. 17, the ESG data 32 is considered as a single resource 39 which can be split into a plurality of data segments $40_1$, $40_2$, $40_3$. In this example, there are fewer data segments than there are sets of metadata. However, the number of data segments may be equal or greater than the number of sets of metadata. Redundant error correction segments (not shown) may be calculated and interleaved with the data segments $40_1$, $40_2$, $40_3$. The updated electronic service guide data 32' is processed in the same way.

Figure 18:
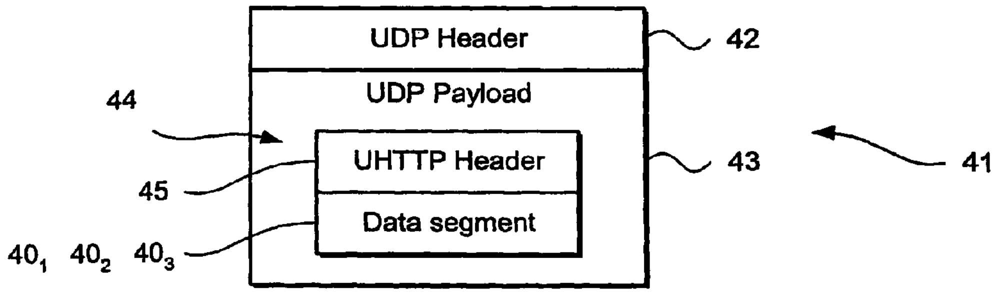
FIG. 18 shows another session announcement message using UDP and UHTTP protocols in accordance with the present invention.
Figure 19:
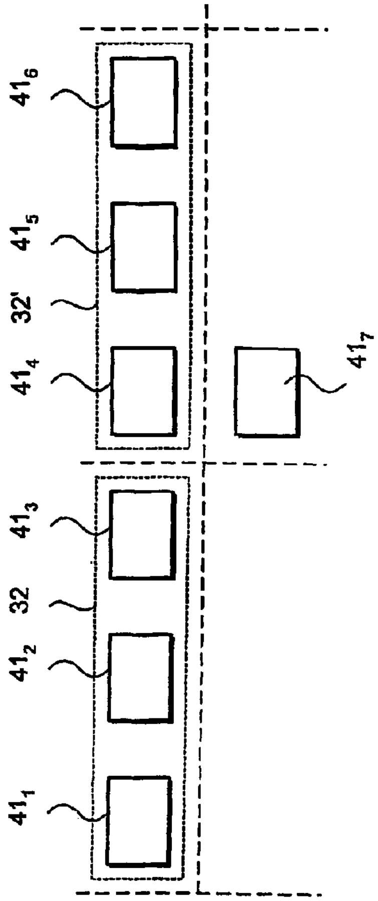
FIG. 19 illustrates transmission of a description of a session directory using session announcement messages shown in FIG. 18 in accordance with the present invention.

Referring to FIG. 18, a user datagram protocol (UDP) packet 41 is shown which includes a UDP header 42 and a UDP payload 43. The UDP payload 43 includes a UHTTP packet 44 which includes a UHTTP header 45 and a data segment $40_1$, $40_2$, $40_3$ as payload. UHTTP allows each data segment $40_1$, $40_2$, $40_3$ to be numbered. Referring to FIG. 19, ESG data 32 is transmitted as a linked transfer and updated ESG data 32' is also transmitted as a linked transfer. For the ESG data 32, first, second and third UDP packets $41_1$, $41_2$, $41_3$ are transmitted. Likewise, for the updated ESG 32', fourth, fifth and sixth UDP packets $41_4$, $41_5$, $41_6$ are transmitted. In each case, if one or more UDP packet $41_1$, $41_2$, $41_3$, $41_4$, $41_5$, $41_6$ is unsuccessfully transmitted or data segment contained therein is unsuccessfully retrieved, then corresponding UDP packets $41_1$, $41_2$, $41_3$, $41_4$, $41_5$, $41_6$ are re-transmitted.

Descriptions of updated sessions are transmitted in a seventh UDP packet $41_7$.

As described earlier, a default session announcement may be used to provide details of the full and updated session directories $29_1$, $29_2$. An example of a default session announcement may include:

v=0
o=dcaster 4289098098 4289099125 IN IP4 130.230.3.2
s=Experimental session directory service
i=Full and update session directories delivered via UHTTP
u=http://www.datacaster.com
e=dcaster@datacaster.com
c=IN IP4 224.2.17.12/127
t=2873397496 2873404696
=data 42451 udp uhttp
a=X-session-directory-full
m=data 42452 udp uhttp
a=X-session-directory-updates In this example, the full session announcements and updated session announcements are provided on different port numbers. Also in this example, UHTTP is used full session announcements and updated session announcements. However, UHTTP may be used for full session announcements, while SAP and SDP may still be used for updated session announcements.

Numbering of data segments $40_1$, $40_2$, $40_3$ allows the client 5 to detect when they have received the ESG data 32. Once this occurs, the client 5 listens for updates.

The use of UHTTP has another advantage. It supports forward error correction (FEC) which can be used to increase the probability of successful transmission even if bit and burst errors occur in transmission. If, however, FEC fails to recover any errors at the client-end, the client 5 waits for periodic UHTTP retransmission. Alternatively, if a return path is provided, then automatic repeat request (ARQ) may be used.

Other protocols which provide reliable delivery of content may be used.

Asynchronous Layer Coding (ALC), or a protocol based on ALC, provides reliable delivery of content and can be used to deliver full or partial ESG metadata, updates and notification of updates.

Asynchronous Layer Coding (ALC) is a scalable reliable content delivery protocol for IP multicasting and reference is made to "Asynchronous Layer Coding protocol instantiation" by M. Luby, J. Gemmell, L. Vicisano, L. Rizzo and J. Crowcroft, RFC 3450, IETF, April 2002 and December 2002.

Reference is also made to "Reliable Multicast Transport Building Blocks for One-to-Many Bulk-Data Transfer" by B. Whetten, L. Vicisano, R. Kermode, M. Handley, S. Floyd and M. Luby, RFC 3048, IETF, January 2001.

Reference is also made to "Layered Coding Transport building block" by B. Whetten, L. Vicisano, L. Rizzo, M. Handley, S. Floyd and M. Luby, Internet Draft, IETF, February 2002.

Session Announcements, Updates and Notifications of Updates Using an ALC-Based Protocol ALC provides a unidirectional transport service for binary objects, such as files. ALC is based on the Layered Coding Transport (LCT) reliable multicast protocol building block and so inherits the LCT concept of sessions comprising one or more layered channels.

An ALC/LCT session comprises of a set of logically grouped channels associated with a single sender carrying packets with ALC/LCT headers for one or more objects. For the delivery of a full or partial ESG, updates and notifications of the updates, a protocol based on the ALC protocol may be used. Thus, an ESG session can be defined which comprises one or more ESG channels. Each ESG channel corresponds to an ALC session.

As explained earlier, an ALC session comprises one or more ALC channels. Each ALC channel may be thought of as “bit pipe” for forwarding packets according to the ALC protocol. In preparation for an ALC session; a sender selects a number of ALC channels and chooses corresponding bitrates for each of them. Each recipient of the ALC session can control the receiving bitrate by selecting to receive either all ALC channels or only some of them.

An ALC channel is uniquely definable and recognizable by a pair of variables (S, G). S is an IP unicast address of the sender and G is a multicast IP address for a multicast receiving group. G may also be a unicast IP address, but RFC 3450 does not define the use of unicast.

Figure 21:
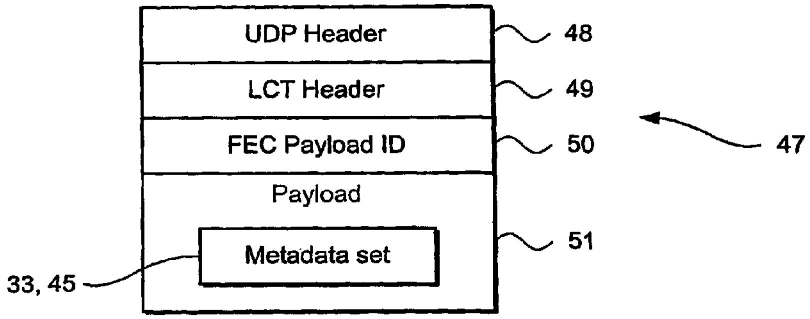
FIG. 21 shows another session announcement message using UDP and ALC protocols in accordance with the present invention.
Figure 22:
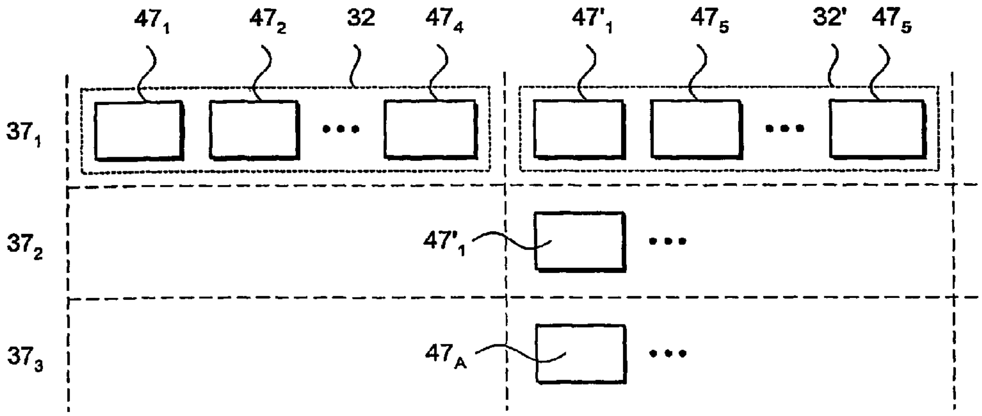
FIG. 22 illustrates transmission of electronic service guide data using ALC channels in accordance with the present invention.

An ALC session is uniquely definable and recognizable by a pair of variable (S, TSI). S is the unicast IP address of the sender and TSI is the value of the Transport Session Identifier field in the header of each ALC packet 47 (FIG. 21).

Using ALC or an ALC-based protocol, an ESG session may be defined which comprises at least one ESG channel. Preferably, the ESG session comprises three ESG channels: one channel for delivering a full or partial ESG, one channel for delivering updates and one channel to notify of updates.

Each respective ESG channel carries data packets having the same value in the Transport Session Identifier (TSI) field. Data packets in the same channel are sent from the same source port and IP address, and may be addressed to a different destination port and/or IP address.

An ESG session may include a full ESG channel, an ESG update channel and an ESG notify channel.

The full ESG channel repeatedly delivers an ESG metadata set representing the sender’s full or partial ESG metadata set. When only a partial ESG is delivered, clients may be provided access to the full ESG via a different protocol, such as a point-to-point ESG transport protocol.

The update ESG channel repeatedly delivers an ESG metadata set comprising parts of the sender’s ESG that have changed since the current version of the full ESG was assembled.

The notify ESG channel repeatedly delivers a metadata set consisting of pointers to parts of the sender’s ESG that have changed since the most recent version of the full ESG was constructed. The pointers are data fields within the metadata set, which identify parts that have changed.

Each of the ESG channels in turn may comprise one or more ALC channels. All ALC channels which constitute an ESG channel are sent on consecutive IP addresses. Only a base IP address used for each ESG channel needs to be signalled to the receivers. This is because a “Next flag” in a Congestion Control Indication field enables receivers to discover the following IP addresses that may have been used for the current ESG channel.

ESG receivers with interactive network connection are able to join and leave transport channels, depending on the type of ESG metadata they need to receive and on the congestion status of the network. ESG receivers that only have unidirectional network connectivity are more restricted, but still have the option of filtering out unnecessary transport channels. Furthermore, a network element such as the ESG proxy (not shown) can reduce the number of transport channels forwarded to a unidirectional link, for example when congestion is detected at the feed of such a link.

Figure 20:
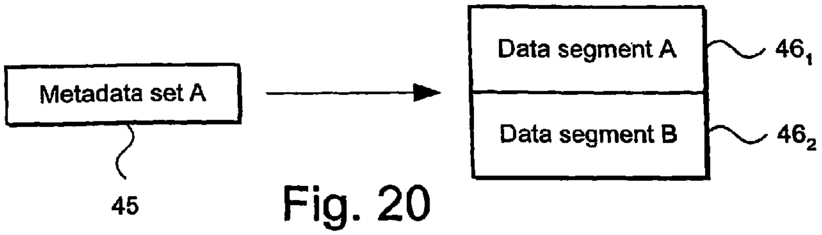
FIG. 20 shows notification of update data in accordance with the present invention.

Referring to FIG. 20, when sets of metadata 33$_1$', 33$_2$, 33$_3$, 33$_4$, 33$_5$ (FIG. 11) for an updated ESG 32' is prepared, a set of metadata 45 for notification of updates is also prepared. The metadata set 45 comprises pointers to any updated sessions 22$_1$'. 22$_5$ (FIG. 9). Optionally, metadata set 45 may be divided into a plurality of data segments 46$_1$, 46$_2$.

Referring to FIG. 21, a packet 47 for delivering metadata sets or data segments is shown. Preferably, the packet 47 is substantially similar to a UDP or ALC packet and may comprise one or more headers, one or more payload data fields and other data fields. A standard header format, such as a UDP header, may be used.

In this example, an ALC packet 47 is described which comprises a UDP header 48, an LCT header 49, an FEC payload ID field 50 and payload 51 which includes at least metadata sets 33, 45 or data segments 46$_1$, 46$_2$.

Between them, the headers, preferably the LCT header 49, may comprise a number of fields (not shown) including a version number field and a number of flags (not shown) including a congestion control flag, a transport session identifier flag, a transport object identifier flag, a half-word flag, a sender current time present flag, an expected residual time present flag, a close session flag and a close object flag. Further data fields may be included which are reserved for future use.

The transport session identifier flag identifies the field format used for the transport session identifier. The transport object identifier flag indicates the field format used for transport object identifier. The sender current time present flag indicates the presence or absence of a sender current time field. The expected residual time present flag indicates the presence or absence of an expected residual time field. The close session flag indicates the ending of the session and the close object flag indicates the ending of the transmission of the object.

Between them, the headers, preferably the LCT header 49, comprise a number of fields (not shown) indicating the length of one or more of the headers and/or of the packet, a number of fields (not shown) with information relating to congestion control and one or more fields (not shown) including one or more identifiers for identifying the transport session and the transport object.

Further data fields (not shown) may carry information, for example relating to ALC encoding symbols and to possible header extensions. The further data fields (not shown) may include information on a Forward Error Correction (FEC) scheme used. FEC data is redundant information generated from, and interleaved with, payload data. The use of FEC allows receivers to reconstruct payload data segments lost or damaged due to transmission errors.

Between them, the headers, preferably the FEC payload ID field 50, includes a source block number (not shown) and an encoding symbol ID (not shown).

The source block number indicates from which source block of the object the encoding symbol(s) in the payload 51 is (are) generated. The encoding symbol ID identifies which specific encoding symbol(s) generated from the source block is (are) are carried in the payload 51.

When a protocol based on the ALC is used, an ALC Protocol Instantiation specific header extension (not shown) is included at least once in the delivery of each transport object. An FEC Object Transmission Information in the header extension enables receivers to discover, in-band, the FEC parameters used to deliver the associated transport object.

A header extension (not shown) comprises one or more fields such as a type of the header extension, a length of the header extension, an identification for the FEC encoder being used, a transfer length of the object, a source block length of every source block of the current transport object carried in the packet payloads, a length of every encoding symbol of the current transport object carried in packet payloads. In addition the header extension may comprise one or more fields reserved for future use.

The information in the congestion control field may, comprise an indication flag, a sequence number the value of which is increased by one for each packet sent, wherein it can be used by receivers to detect packet loss and a part reserved for future use.

When the indication flag is set to '1', it indicates that the current ALC session consists of two or more ALC channels including the current IP address and the next consecutive IP address. A value of '0' in this field indicates that the current IP address is the highest IP address in the current ALC session. Receivers may monitor this field to detect dynamic addition or deletion of ALC channels by ESG senders.

Further details relating to ALC packet format can be found in "Asynchronous Layer Coding protocol instantiation", RFC 3450, ibid.

In an embodiment of the present invention, the announcements can be regarded as binary objects and thus be called transport objects. Each transport object is identified by the value of a transport object identifier field (not shown), which is unique within the scope of one transport session. Each ESG metadata set is preferably sent as a separate transport object.

For each transport object, additional information may be defined in the form of an ESG delivery table (not shown). On the sender side, ESG delivery table can be inserted in every transport session. On the receiver-side, ESG delivery table information parsing can be provided.

For each type of transport channel in a transport session, a different delivery table can be transmitted.

The ESG delivery table (not shown) may be defined as a set of mappings, each comprising a transport object identifier value and the properties of the transport object. The ESG delivery table may comprise two parts: an ESG header and an ESG payload.

The ESG delivery table header comprises fields for header extension type, header extension length, ESG delivery table version and ESG delivery table expiry.

The ESG header extension is a variable length protocol instantiation specific header extension and it is included in all packets carrying ESG delivery table and it is identical for all packets carrying the same version of the ESG delivery table. The ESG delivery table version is the number of the currently transmitted ESG delivery table. This field has the value of '0' for the ESG delivery table of a new ALC transport session, and is increased by one whenever an updated ESG delivery table is constructed for the same ALC transport session. After reaching its predefined maximum value, the version number wraps back to '0'. The ESG delivery table expiry is a time value, indicating the time after which the ESG delivery table is not expected to be valid. A new version of the ESG delivery table is preferably sent before the expiry time of the current version. However, receivers should continue using the current version of the ESG delivery table even after its expiry time if they have not received a newer version.

The ESG payload contains the actual mappings between transport object identifiers and the attributes associated with the transport object identified by each transport object identifier. The ESG payload format may be an XML structure represented as ASCII text, comprising one or more fields such as e.g. a unique identifier for the transport object within the current ALC transport session, a URL for uniquely identifying the current transport object, the length in bytes of the transport object, the MIME type of the transport object, an identifier for the encoding used for the transport object, such as ZLIB compression and an MD5 checksum for the transport object. The ESG payload fields may use the syntax and semantics of the corresponding fields defined in the HTTP 1.1 specification.

Figure 23:
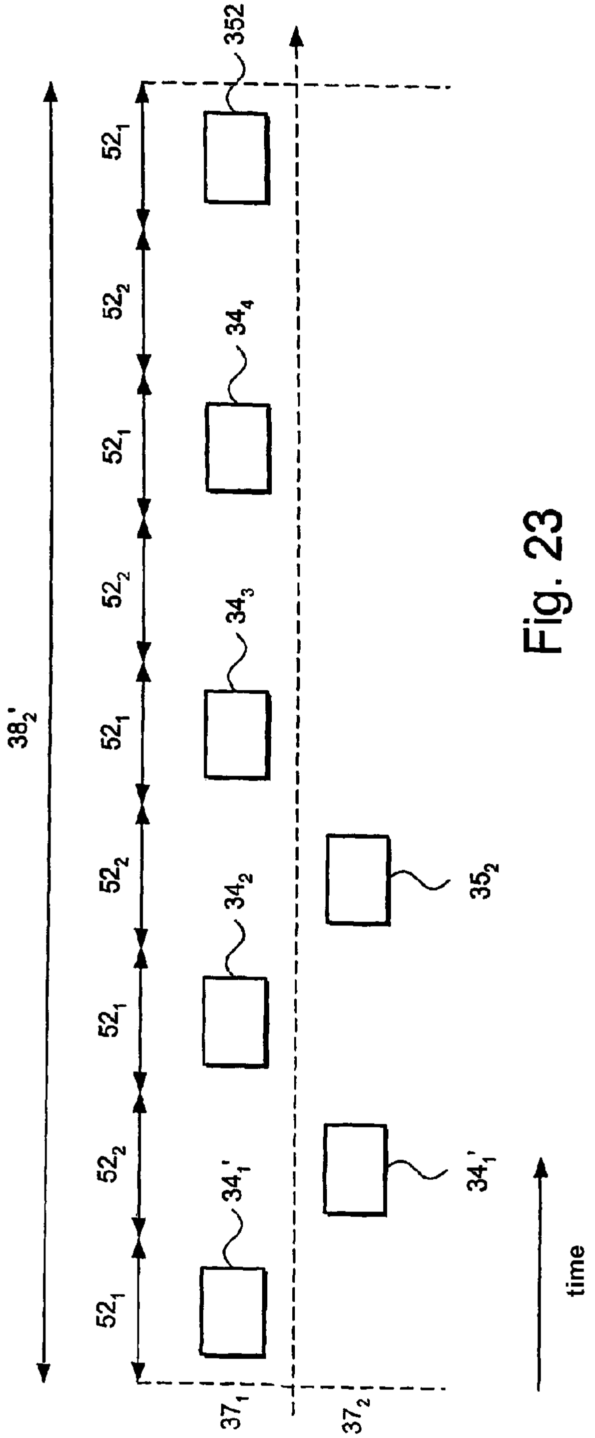
FIG. 23 shows transmission of a description of a session directory using session announcement messages using time division multiplexing in accordance with the present invention.

Referring to FIG. 23, delivery of a full ESG as a first set of announcements 37$_1$, delivery of updated ESG as a second set of announcements 37$_2$ and delivery of notifications of the updates as a third set of announcements 37$_3$ are shown.

As explained earlier, announcements comprising notification of updates can be sent more frequently than announcements comprising updates.

The datacast client 5 can choose to listen to announcements comprising notifications of updates in preference to announcements comprising updates. If they receive a notification of an update to a session in which the user may be interested, then the datacast client 5 can listen to announcements comprising updates and/or obtain a description of the session in another way, such by unicast.

Time Division Multiplexing

In the embodiments described earlier, IP packets comprising portions of ESG data 32, 32' can be transmitted by the datacaster 3 to the client 5 as-and-when transmission slots become available. However, to ensure that the client 5 receives the IP packets, it is preferable that the client 5 be configured to receive data at any time. This has the drawback of unnecessarily using processing and electrical power.

A solution to this problem is to employ time division multiplexing (TDM).

Referring to FIG. 23, an alternative manner of transmitting a description of the session directory 28 in accordance with the present invention is shown. In this example, only a later cycle 38$_2$' including the two types of session announcements 37$_1$, 37$_2$ is shown.

Announcements of the first type 37$_1$ for describing ESG data and announcements of the second type 37$_2$ for describing updates to ESG data are transmitted in different time slots 52$_1$, 52$_2$. For example, the announcements of the first and second types 37$_1$, 37$_2$ are transmitted in alternate time slots. However, the time slots 52$_1$, 52$_2$ need not be adjacent. The time slots may be of variable or fixed length.

Thus, if the client 5 wishes to listen for updates to ESG data, then they do not need to listen to time slots 52$_1$ during which announcements of the first type 37$_1$ are transmitted, but may listen to time slots 52$_2$ during which only announcements of the second type 37$_2$ are sent. This allows the client 5 to switch off its receiver 14 (FIG. 1) during time slots 52$_1$. The ESG data contains information when the receiver of the client needs to be turned on or off and/or when the content is on the air within service area defined by datacast operator Datacast Client 5

Figure 24:
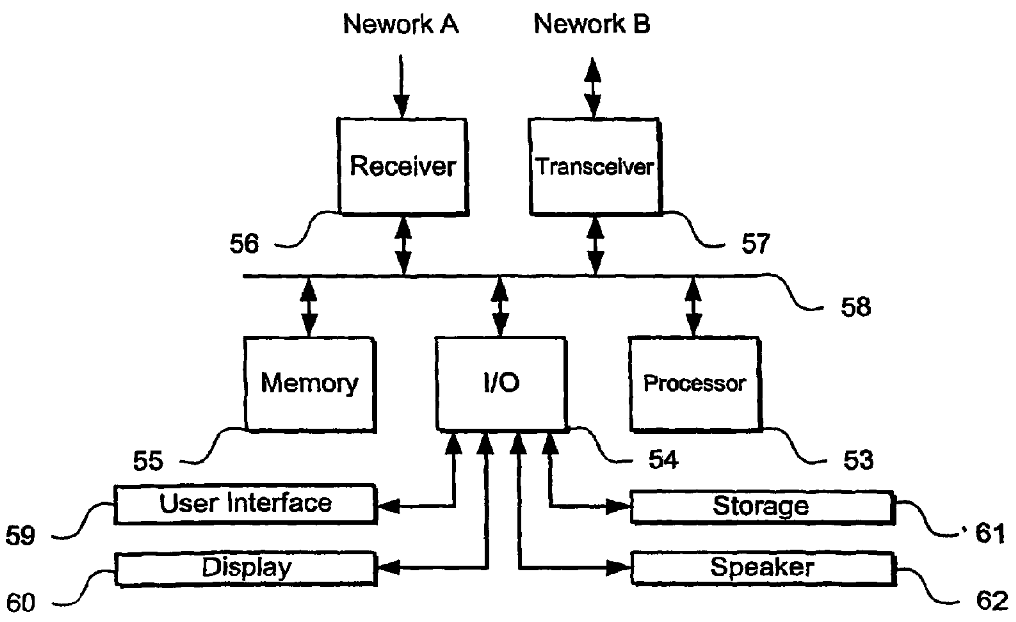
FIG. 24 shows a schematic diagram of a terminal used to receive multicast data in accordance with the present invention and FIG. 25 shows an electronic service guide browser in accordance with the present invention.

Referring to FIG. 24, an embodiment of a datacast client 5 according to the present invention comprises a processor 53, input/output interface 54, memory 55, a receiver 56 and a transceiver 57 which are connected via a bus 58. The input/output interface 54 is connected to a user interface 59, a display 60, storage 61 and speaker 62.

The datacast client 5 may be a handheld mobile communication device for use with first and second wireless communication networks in accordance with the present invention. For example, the first wireless communication network may be a DVB-T or DAB network, or any modification of these or similar networks, and the receiver 56 may be configured to receive and demodulate signals from such a network. The second wireless communication network may be a UMTS network or other 3G, 2.5G or 2G telecommunications network and the transceiver 57 may be configured to receive/transmit and demodulate/modulate signals via a UMTS or similar network.

The datacast client 5 may be a set-top box connected to a television set for use with first and second wired and/or wireless communication networks. For example, the first communication network may be a DVB-T network and the receiver 56 may be configured to receive and demodulate signals from a DVB-T network. The second communications network may the Internet and the transceiver 57 may include a modem (not shown) for connection via a public switched telephone network to an Internet Service Provider Using two networks, sessions and session announcements may be transmitted over different networks. Alternatively, the first and second types of session announcements may be transmitted over different networks.

When two networks are available, the user of the client device may control the delivery of full or partial ESG metadata, updates thereof and notifications of updates by using a request-response model, wherein the requests are transmitted to the datacast service system through the second communications network. In the communication between the client and the datacast service acknowledgements may be used if required. The client may make a request for notifications using the second communications network, wherein selected notifications are transmitted to the client when such notifications are created.

Computer programs (not shown) when loaded into memory 55 and run by the processor 53 cause the processor 53, in conjunction with other elements of the device, to provide the service discovery client 15, the ESG browser 17, the content filtering application 18 and the content browser 20 respectively. Storage 61 is used to hold the ESG and content databases 16, 19. The user interface 59 allows the user to provide instructions to the ESG browser 17 and the content browser 20, such as instruction to select a session. The display 60 allows the user to view session descriptions and session content. The speaker 62 allows the user to hear session content.

ESG Browser

Figure 25:
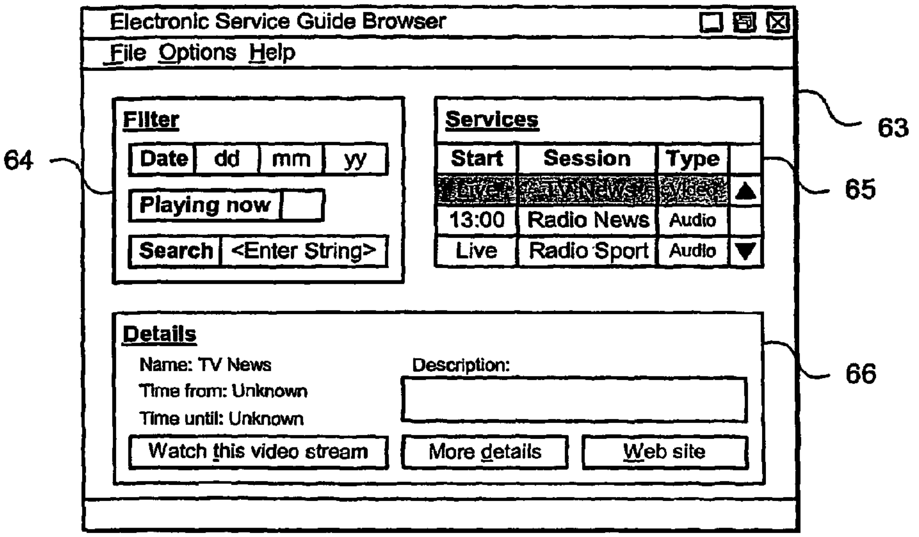

Referring to FIG. 25, an example of an ESG browser window 63 is shown. The window 63 includes a first section 64 for receiving instructions for filtering sessions, for example on the basis of date of transmission, whether a session is current being transmitted or search terms. The window 63 includes a second section 65 for displaying a list of filtered sessions and receiving instructions to select a session. The window 63 includes a third section 66 for displaying a description of a selected session and receiving instructions to access the session.

It will be appreciated that many modifications may be made to the embodiment hereinbefore described.

Session announcements may be unicast, rather than multicast, to a client.

Sessions and session announcements may be transmitted over different networks. For example, sessions may be transmitted over a DVB network and session announcements may be sent via a DAB network.

The first and second types of session announcements may be transmitted over different networks. For instance, announcements of the first type may be transmitted through a DVB-T network, while announcements of the second type may be sent though a 3G network. The first and second types of session announcements may be transmitted through the same network, but over one or more different physical channels, for example at different carrier frequencies. The first and second types of session announcements may be transmitted through the same network and over the same physical channels, but over one or more different logical channels.

From reading the present disclosure, other variations and modifications will be apparent to persons skilled in the art. Such variations and modifications may involve equivalent and other features which are already made in design, manufacture and use of systems for announcing sessions and component parts thereof and which may be used instead of or in addition to features already described herein.

Although claims have been formulated in this application to particular combinations of features, it should be understood that the scope of disclosure of the present invention also includes any number of features or any other combinations of features disclosed herein either implicitly or explicitly or any generalisation thereof, whether or not it relates to the same invention as presently claimed in any claim or whether or not it mitigates any or all of the scientific problems as does the present invention. The applicants hereby give notice that new claims may be formulated to such features and/or combination of features during the prosecution of the present application or any further application derived therefrom.

The invention claimed is:

1. A method comprising:

causing, at least in part by an apparatus of a service provider, a transmission of a first set of announcements of electronic service guide data including identification and description of a plurality of multimedia sessions of a first version to be transmitted through a network;

causing, at least in part by the apparatus, a transmission of a second set of announcements of electronic service guide data including identification and description of one or more updated multimedia sessions that are updated into the plurality of multimedia sessions of the first version; and causing, at least in part by the apparatus, a transmission of a third set of announcements of electronic service guide data including the identification of the one or more updated multimedia sessions and excluding the description of the one or more updated multimedia sessions, wherein the third set of announcements is generated and transmitted more frequently than the second set of announcements.

2. A method according to claim 1, wherein said first set of announcements is transmitted through a first channel, and said second set of announcements is transmitted through a second, different channel, wherein the first and second channels are logically grouped and associated with one sender.

3. A method according to claim 1, wherein said first set of announcements is transmitted through a first IP address, and said second set of announcements is transmitted through a second, different IP address respectively.

4. A method according to claim 1, said first set of announcements is transmitted through a first port number, and said second set of announcements is transmitted through a second, different port number respectively.

5. A method according to claim 1, wherein each announcement of said first set of announcements is included with data for identifying said announcement as an announcement which describes one of said plurality of multimedia sessions, and each announcement of said second set of announcements is included with data for identifying said announcement as an announcement which describes one of said at least one updated multimedia session.

6. A method according to claim 1, wherein each announcement of said first set of announcements is included with respective data for specifying a position of a corresponding multimedia session within a first portion of a multimedia session directory, and each announcement of said second set of announcements is included with respective data for specifying a position of a corresponding multimedia session within a second portion of the multimedia session directory.

7. A method according to claim 1, wherein the first set of announcements of electronic service guide data describe an electronic program guide.

8. A method according to claim 1, comprising arranging the providing of said second set of announcements after the providing of said first set of announcements.

9. A method according to claim 1, wherein said first set of announcements is transmitted according to a session announcement protocol, a unidirectional transport protocol, or a user datagram protocol.

10. A method according to claim 7, wherein the network is a digital video broadcasting network, an advanced television systems committee network, an integrated services digital broadcasting network, or an internet protocol based broadcasting network.

11. A method according to claim 1, wherein said first set of announcements describe available electronic services including newspapers, radio, television and songs, videos, pictures, games, software, or a combination thereof.

12. A method according to claim 1, wherein the third set of announcements further includes one or more pointers pointing to the description of the one or more updated multimedia sessions.

13. A method according to claim 1, further comprising including a description of a corresponding multimedia session arranged according to session description protocol in each announcement.

14. A method according claim 1, wherein said first set of announcements is transmitted as a series of linked messages.

15. A method according to claim 1, wherein said first set of announcements is transmitted in a first set of time slots, said second set of announcements is transmitted in a second set of time slots, each timeslot of said first set of timeslots being provided at a different time from each timeslot of said second set of timeslots.

16. A method according to claim 1, further comprising multiplexing said first and second sets of announcements.

17. A method according to claim 1, wherein the second set of announcements is provided with a set of pointers pointing to the at least one updated multimedia session.

18. A method according to claim 1, wherein at least one of said first and second sets of announcements is transmitted according to an asynchronous layered coding protocol.

19. A method according to claim 1, wherein the second set of announcements describing the at least one updated multimedia session are in the form of a set of pointers identifying the at least one updated multimedia session.

20. A method according to claim 1, wherein the at least one of said first and second sets of session announcements are transmitted according to an asynchronous layered coding protocol or a protocol based on the asynchronous layered coding protocol.

21. A method according to claim 1, further comprising: in response to a user request based on an electronic service guide describing a plurality of multimedia sessions of a second version including the one or more updated multimedia sessions, establishing one or more multimedia sessions through the network.

22. A method according to claim 1, further comprising: transmitting a user request based on the assembled electronic service guide; and establishing one or more multimedia sessions through the network based on the user request.

23. A method comprising:

receiving, at a user device, a first set of announcements of electronic service guide data including identification and description of a plurality of multimedia sessions of a first version transmitted through a network;

subsequently receiving, at the user device, a second set of announcements of electronic service guide data including identification and description of one or more updated multimedia sessions that are updated into the plurality of multimedia sessions of the first version, and a third set of announcements of electronic service guide data including the identification of the one or more updated multimedia sessions and excluding the description of the one or more updated multimedia sessions, or a combination thereof, while stopping receiving the first set of announcements; and accessing the received multimedia sessions to assemble, at the user device, an electronic service guide describing a plurality of multimedia sessions of a second version including the one or more updated multimedia sessions, wherein the third set of announcements is received more frequently than the second set of announcements.

24. A method according to claim 23, further comprising:

determining, at the user device, that at least one version of the second or third set of announcements is missed; and receiving, at the user device, a new version of the first set of announcements.

25. A method according to claim 23, wherein the at least one of said first and second sets of session announcements are received according to an asynchronous layered coding protocol or a protocol based on the asynchronous layered coding protocol.

26. An apparatus comprising:

at least one processor; and at least one memory including computer program code, the at least one memory and the computer program code configured to, with the at least one processor, cause the apparatus of a service provider to perform at least the following, cause, at least in part, a transmission of a first set of announcements of electronic service guide data including identification and description of a plurality of multimedia sessions of a first version to be transmitted through a network;

cause, at least in part, a transmission of a second set of announcements of electronic service guide data including identification and description of one or more updated multimedia sessions that are updated into the plurality of multimedia sessions of the first version; and cause, at least in part, a transmission of a third set of announcements of electronic service guide data including the identification of the one or more updated multimedia sessions and excluding the description of the one or more updated multimedia sessions, wherein the third set of announcements is generated and transmitted more frequently than the second set of announcements.

27. An apparatus comprising:

at least one processor; and at least one memory including computer program code, the at least one memory and the computer program code configured to, with the at least one processor, cause the apparatus embedded in a user device to perform at least the following, receive a first set of announcements of electronic service guide data including identification and description of a plurality of multimedia sessions of a first version transmitted through a network;

subsequently receive a second set of announcements of electronic service guide data including identification and description of one or more updated multimedia sessions that are updated into the plurality of multimedia sessions of the first version, and a third set of announcements of electronic service guide data including the identification of the one or more updated multimedia sessions and excluding the description of the one or more updated multimedia sessions, or a combination thereof, while stopping receiving the first set of announcements; and access the received multimedia sessions to assemble an electronic service guide describing a plurality of multimedia sessions of a second version including the one or more updated multimedia sessions, wherein the third set of announcements is received more frequently than the second set of announcements.

28. The apparatus according to claim 27, wherein the apparatus is further caused to determine whether said first set of announcements has been received; and if said first set of announcements has been received, to receive said second set of announcements.

29. The apparatus according to claim 27, which is a mobile communications device.

30. A non-transitory computer-readable storage medium storing one or more sequences of one or more instructions which, when executed by one or more processors, cause an apparatus of a service provider to at least perform the following steps:

causing, at least in part, a transmission of a first set of announcements of electronic service guide data including identification and description of a plurality of multimedia sessions of a first version to be transmitted through a network;

causing, at least in part, a transmission of a second set of announcements of electronic service guide data including identification and description of one or more updated multimedia sessions that are updated into the plurality of multimedia sessions of the first version; and causing, at least in part, a transmission of a third set of announcements of electronic service guide data including the identification of the one or more updated multimedia sessions and excluding the description of the one or more updated multimedia sessions, wherein the third set of announcements is generated and transmitted more frequently than the second set of announcements.

31. A non-transitory computer-readable storage medium storing one or more sequences of one or more instructions which, when executed by one or more processors, cause an apparatus embedded in a user device to at least perform the following steps:

receiving a first set of announcements of electronic service guide data including identification and description of a plurality of multimedia sessions of a first version transmitted through a network;

subsequently receiving a second set of announcements of electronic service guide data including identification and description of one or more updated multimedia sessions that are updated into the plurality of multimedia sessions of the first version, and a third set of announcements of electronic service guide data including the identification of the one or more updated multimedia sessions and excluding the description of the one or more updated multimedia sessions, or a combination thereof, while stopping receiving the first set of announcements; and accessing the received multimedia sessions to assemble an electronic service guide describing a plurality of multimedia sessions of a second version including the one or more updated multimedia sessions, wherein the third set of announcements is received more frequently than the second set of announcements.

* * * * *